(12) United States Patent
Oshida et al.

(10) Patent No.: US 8,149,473 B2
(45) Date of Patent: Apr. 3, 2012

(54) IMAGE READING APPARATUS

(75) Inventors: Haruhisa Oshida, Abiko (JP); Yuichi Yamamoto, Toride (JP); Ayumu Murakami, Abiko (JP); Takuma Koizumi, Toride (JP); Kiyoshi Oyama, Tokyo (JP); Toshifumi Itabashi, Toride (JP); Yusuke Imai, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 1158 days.

(21) Appl. No.: 11/915,945

(22) PCT Filed: Dec. 22, 2005

(86) PCT No.: PCT/JP2006/326310
§ 371 (c)(1),
(2), (4) Date: Nov. 29, 2007

(87) PCT Pub. No.: WO2007/074914
PCT Pub. Date: Jul. 5, 2007

(65) Prior Publication Data
US 2009/0316222 A1 Dec. 24, 2009

(30) Foreign Application Priority Data

Dec. 27, 2005 (JP) .................................. 2005-376411
Dec. 27, 2005 (JP) .................................. 2005-376412
Dec. 27, 2005 (JP) .................................. 2005-376414

(51) Int. Cl.
*H04N 1/04* (2006.01)
(52) U.S. Cl. ........ 358/474; 358/496; 358/497; 358/498; 358/482; 358/483; 358/408; 358/490; 358/493; 250/208.1; 250/234; 250/236
(58) Field of Classification Search .................. 358/493, 358/496, 498, 474, 505, 490, 491, 483, 482, 358/408, 497, 487, 506; 399/361, 364, 367, 399/374; 250/208.1, 234, 236
See application file for complete search history.

(56) References Cited

U.S. PATENT DOCUMENTS

| | | | |
|---|---|---|---|
| 4,725,891 A * | 2/1988 | Manian | 358/406 |
| 4,792,828 A | 12/1988 | Ozawa et al. | 355/14 R |
| 4,812,874 A | 3/1989 | Kubota et al. | 355/7 |
| 4,829,341 A | 5/1989 | Sasaki et al. | 355/75 |
| 4,830,484 A | 5/1989 | Yamamoto et al. | 353/25 |
| 4,908,662 A | 3/1990 | Yamamoto et al. | 355/218 |
| 5,057,942 A | 10/1991 | Kanehl et al. | |
| 6,326,992 B1 | 12/2001 | Inoue et al. | |
| 6,344,904 B1 * | 2/2002 | Mercer | 358/296 |

(Continued)

FOREIGN PATENT DOCUMENTS

| | | |
|---|---|---|
| JP | 64-015970 | 1/1989 |
| JP | 64-020770 | 1/1989 |
| JP | 64-020770 A * | 1/1989 |

(Continued)

*Primary Examiner* — Cheukfan Lee
(74) *Attorney, Agent, or Firm* — Fitzpatrick, Cella, Harper & Scinto

(57) ABSTRACT

An image reading apparatus is provided that can prevent image streaks due to dirt, stain or the like from being produced in an image of an original that is read while being conveyed. The image reading apparatus (A) includes an ADF (40) having a scanner unit (59) incorporated therein and comprised of a cylinder (60) having an outer peripheral surface thereof on which a plurality of read pixels (61) are arranged in a matrix. In reading an original (D), the scanner unit is rotatably driven in an original conveying direction at a circumferential speed approximately equal to an original conveying speed, and reads image information on the original passing through an image reading position (P1).

21 Claims, 30 Drawing Sheets

U.S. PATENT DOCUMENTS

| | | | |
|---|---|---|---|
| 7,145,698 B2 | 12/2006 | Yamamoto | 358/408 |
| 7,724,404 B2 * | 5/2010 | Mercer | 358/474 |
| 2003/0002091 A1 * | 1/2003 | Hou | 358/496 |
| 2006/0227387 A1 * | 10/2006 | Patterson | 358/474 |
| 2007/0013971 A1 * | 1/2007 | Spears | 358/474 |

FOREIGN PATENT DOCUMENTS

| | | |
|---|---|---|
| JP | 04-225678 A | 8/1992 |
| JP | 04-326244 A | 11/1992 |
| JP | 2003-8836 | 1/2003 |
| WO | 2003/005519 A1 | 1/2003 |

* cited by examiner

IMAGE READING APPARATUS

TECHNICAL FIELD

The present invention relates to an image reading apparatus that reads an image on an original being conveyed.

BACKGROUND ART

Conventionally, an image reading apparatus is provided in a copying machine or the like. In some image reading apparatuses, originals supplied from an auto document feeder can be read by a scanner unit stopped at a predetermined position, while conveyed in a sub-scanning direction. An image reading apparatus capable of reading both sides of an original is also known (refer to Japanese Laid-open Patent Publication No. 2003-008836, for example).

With reference to FIG. 32, an explanation will be given of an image forming apparatus equipped with an image reading apparatus capable of reading both sides of an original. FIG. 32 is a longitudinal section view showing the construction of an image forming apparatus having a conventional image reading apparatus.

As shown in FIG. 32, the image forming apparatus includes an image reading apparatus A that reads image information on an original, and a printer apparatus B that forms an image on a sheet based on the image information read by the image reading apparatus A.

The image reading apparatus A is comprised of an auto document feeder (hereinafter referred to as the ADF) and a scanner apparatus 1. The ADF 2 includes an original tray 12, a pickup roller 43, a pair of separation rollers 44a, 44b, a plurality of conveyance rollers 46, 48, a discharge roller 49, and a discharge tray 50. Originals D are stacked on the original tray 12. The originals D stacked on the original tray 12 are separated one by one by the pickup roller 43 and the separation roller pair 44a, 44b, and then delivered to a conveying path 156. Each original D is conveyed by the conveyance roller 46 along the conveying path 156, and an image on the original D is read by the scanner apparatus 1. After the image reading, the original is discharged to the discharge tray 50 by the conveyance roller 48 and the discharge roller 49.

For double-sided reading of originals D, there is provided an inversion flap 152 at a location downstream of the conveyance roller 48. Also provided is an inversion conveying path 153 that inverts a surface of the original D being scanned.

The scanner apparatus 1 has a platen glass 22 and a scanner unit 21 disposed below the platen glass 22. The scanner unit 21 is constructed so as to be movable in a direction shown by an arrow F in FIG. 32 (sub-scanning direction), while being guided by a guide rail 24. The scanner unit 21 is equipped with a plurality of lamps 21c that irradiate an original, a line CCD (charge coupled device) 21g, an optical system 21f that guides light reflected from the original irradiated by the lamps 21.

The image reading apparatus A has two scanning modes, i.e., an original flow scanning mode and a fixed original scanning mode, and is capable of reading an original in each of these scanning modes.

The original flow scanning mode is a mode where an original fed from the ADF 2 is read by the scanner unit 21 while being conveyed in the sub-scanning direction. Specifically, an original D is fed from the ADF 2, and the original D is conveyed in the sub-scanning direction. At this time, the scanner unit 21 is caused to stop at a flow reading position 101. When the original D conveyed in the sub-scanning direction passes through the flow reading position 101 while being in close contact with a flow scanning glass 102, the scanner unit 21 reads the original D in a main scanning direction. As a result, the entire one side of the original D is read. Then, the original is discharged to the discharge tray 50 by the conveyance roller 48 and the discharge roller 59. In this manner, the one side of the original D is read.

When a double-sided scanning mode is selected in the original flow scanning mode, the original D is pulled out by the discharge roller 49 until its rear end passes through the inversion flap 152 after a first side of the original D has been read. The inversion flap 152 is switched and the discharge roller 49 is reversely driven. As a result, the original D is introduced into the conveying path 153 and the surface of the original to be scanned is inverted. The original D is conveyed again by the conveyance roller 46 toward the flow reading position 101, and a second side of the original D is read by the scanner unit 21. In this manner, both the sides of the original D are read.

On the other hand, in the fixed original scanning mode, the original D is placed on the predetermined position on the platen glass 22, and the scanner unit 21 is moved in the sub-scanning direction relative to the placed original D. Specifically, the scanner unit 21 is moved in the sub-scanning direction relative to the original D placed on the platen glass 22, while reading the original D in the main scanning direction, whereby the entire original is read.

The printer apparatus B includes a laser unit 3. The laser unit 3 modulates laser light based on image data (video signal) read by the image reading apparatus A, and irradiates the laser light onto the photosensitive drum 10. As a result, an electrostatic latent image is formed on the photosensitive drum 10. The electrostatic latent image formed on the photosensitive drum 10 is visualized into a toner image by toner supplied from a developing unit 11. The toner image is transferred by a transfer unit 6 onto a sheet P fed from a sheet cassette 4 via a resist roller 5. The sheet P on which the toner image has been transferred is delivered to a fixing device 7. The fixing device 7 heats and presses the sheet P, thereby fixing the toner image on the sheet P. The sheet P on which the toner image has been fixed is discharged to a discharge tray 9 by a discharge roller 8.

However, in the original flow scanning, when the flow scanning glass 102 has a stain, such stain can produce image streaks extending in the sub-scanning direction in the read image information. For example, an original is sometimes stained with ballpoint ink, correction fluid, glue or the like. When such stain is adhered to the flow scanning glass during the original reading process, image streaks are produced in subsequently read image information. These image streaks cannot be eliminated unless the stain on the flow scanning glass 102 is removed, making it impossible to obtain an image of high quality.

Recently, an image reading apparatus has been in practical use, in which two image reading devices are disposed on both sides of an original conveying path, and images on both sides of an original being conveyed along an original conveying path extending between these devices are simultaneously read the image reading devices.

With reference to FIG. 33, the above image reading apparatus will be explained. FIG. 33 is a longitudinal section view showing the conventional image reading apparatus capable of simultaneously reading images on both sides of an original.

As shown in FIG. 33, the image reading apparatus includes two scanner units 121, 160. The scanner unit 121, 160 are disposed at a flow reading position 101 so as to face each other, with a conveying path 161 interposed therebetween.

Each of the scanner units 121, 160 is the same in construction as the scanner unit 21 of the aforementioned image forming apparatus.

In the image reading apparatus, originals D are delivered one by one from an original tray 12 to the flow reading position 101. When each original D passes through the flow reading position 101, an image of a first side of the original D is read by the scanner unit 121, and at the same time an image of a second side of the original D is read by the scanner unit 160. Thereafter, the original D is discharged to a discharge tray 50 by a conveyance roller 49.

The image reading apparatus having the construction shown in FIG. 33 is capable of reading both sides of an original in a short period of time, offering high productivity. However, as in the construction shown in FIG. 32, when either the scanner unit 121 or 160 has a stain at its face facing an original, the stain can produce image streaks extending in the sub-scanning direction in the read image information. It should be noted that, with the construction shown in FIG. 33, a deviation can occur between scanned images of the first and second sides of the original. D when the scanner unit 160 is not accurately positioned relative to the scanner unit 121, resulting in such drawbacks that the images are distorted. In particular, in a case where the scanner unit 121 is provided in the scanner apparatus 1 and the scanner unit 160 is provided in the ADF 2 that can be opened and closed relative to the scanner apparatus 1, an adjustment device must be provided for aligning the relative positions of the scanner units 121, 160.

DISCLOSURE OF INVENTION

An object of the present invention is to provide an image reading apparatus that can prevent image streaks due to dirt, stain or the like from being produced in an image of an original that is read while being conveyed.

To attain the object, the present invention provides an image reading apparatus comprising a rotating member having an outer peripheral surface thereof on which a plurality of optical sensors are disposed, and a driving device that causes the rotating member to rotate, wherein an image of an original conveyed along the outer peripheral surface of the rotating member is read by the plurality of optical sensors while the rotating member is rotated by the driving device.

According to the image reading apparatus of the present invention, it is possible to prevent image streaks due to dirt, stain or the like from being produced in an image of an original that is read while the original is being conveyed.

The above and other features and advantages of the present invention will be apparent from the following description taken in conjunction with the accompanying drawings, in which like reference characters designate the same name or similar parts throughout the figures thereof.

BEST MODE FOR CARRYING OUT THE INVENTION

In the following, preferred embodiments of the present invention will be explained with reference to the appended drawings.

First Embodiment

Figure 1:
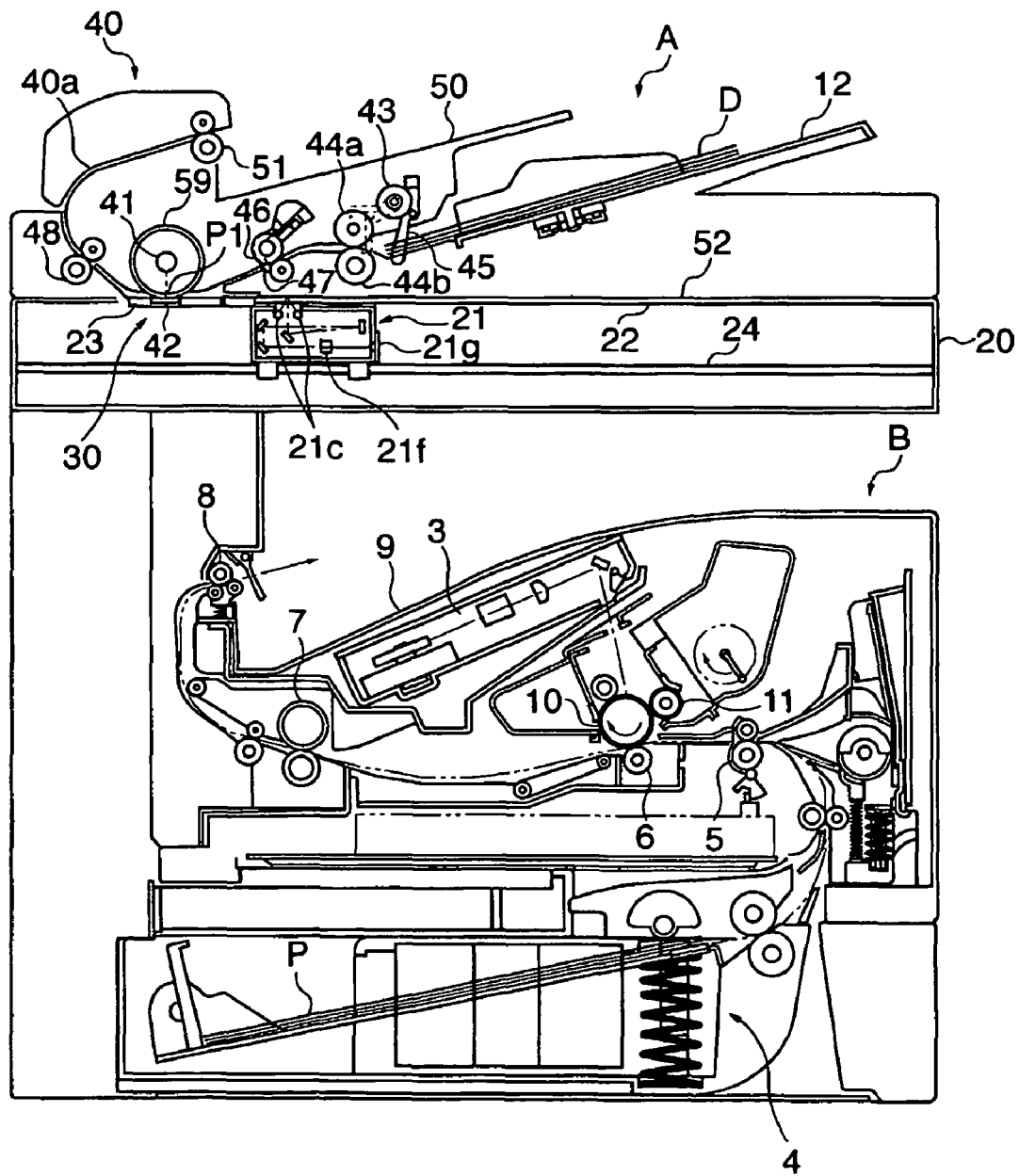
FIG. 1 is a longitudinal section view showing the construction of an image forming apparatus equipped with an image reading apparatus according to a first embodiment of the present invention.

FIG. 1 is a longitudinal section view showing the construction of an image forming apparatus equipped with an image reading apparatus according to a first embodiment of the present invention.

As shown in FIG. 1, the image forming apparatus includes an image reading apparatus A that reads image information on an original and a printer apparatus B that forms an image on a sheet based on image information read by the image reading apparatus A.

The image reading apparatus A is comprised of an ADF 40 and a scanner apparatus 20. The ADF 40 includes an original tray 12 on which originals D are stacked, and an original detecting sensor 45 that detects whether or not there are any original D on the original tray 12. The originals D stacked on the original tray 12 are separated one by one by a pickup roller 43 and a pair of separation rollers 44a, 44b, and each original is drawn into the apparatus A. The drawn-in original D is conveyed at a predetermined conveying speed by a conveyance roller 46, as an original conveying device, toward a reading section 30 that reads image information on the original D. The conveying speed is variable in accordance with a scanning mode, a reading resolution and the like that are set by a user. Near the conveyance roller 46, an original edge sensor 47 that detects an end portion of an original D is disposed. A detection signal from the original edge sensor 47 is used to detect original jamming, for instance.

The reading section 30 is comprised of a scanner unit 59 formed into a cylindrical shape and a pressurizing member 23 adapted to be in contact with an outer peripheral surface of the scanner unit 59. In an image reading position, the scanner unit 59 is rotatably driven by a driving motor as a driving device at a circumferential speed nearly equal to an original conveying speed so that an outer peripheral surface of the scanner unit 59 moves in the same direction as a direction of conveyance of an original D. While being rotated, the scanner unit 59 reads image information on the original D. The pressurizing member 23 is mounted with a reference member 42 that acquires shading correction data (shading data). The pressurizing member 23 is disposed such that the reference member 42 thereof faces the scanner unit 59. The details of the scanner unit 59 and the pressurizing member 23 will be described below.

The original D passing through the reading section 30 is conveyed by a conveyance roller 48 along a conveying path 40a, and then discharged onto a discharge tray 50 by a discharge roller 51.

The ADF 40 is designed to be capable of being opened and closed relative to the scanner apparatus 20. When the ADF 40 is opened, an original can be placed on the platen glass 22 of the scanner apparatus 20. The ADF 40 is provided with a white background plate 52 that is disposed to face the platen glass 22 when the ADF 40 is closed. By means of the white background plate 52, an original placed on the platen glass 22 is brought in close contact with the platen glass 22.

The scanner apparatus 20 includes the platen glass 22, and a scanner unit 21 disposed below the platen glass 22. The scanner unit 21 is designed to be movable in the sub-scanning direction while being guided by a guide rail 24. The scanner unit 21 is equipped with a plurality of lamps 21c that illuminate an original, a line CCD 21g, and an optical system 21f that guides light reflected from an original illuminated by the lamps 21c, to the line CCD 21g. The optical system 21f includes a plurality of reflecting mirrors and a focusing lens.

The image reading apparatus A comprises two modes, i.e., an ADF scanning mode in which the ADF 40 is used, and a fixed original scanning mode in which the scanner unit 21 is used, and is capable of reading an original in each mode.

In the ADF scanning mod, originals stacked on the original tray 12 are fed by the ADF 40. At this time, the scanner unit 59 is rotated in the original conveying direction at a circumferential speed nearly equal to the conveying speed of the original D. The original D is conveyed to between the scanner unit 59 and the pressurizing member 23, and is thus conveyed along an outer peripheral surface of a cylinder 60. At this time, while being rotated, the scanner unit 59 reads image information on the original D that is being conveyed. The details of the ADF scanning mode will be described later.

On the other hand, in the fixed original scanning mode, the ADF 40 is opened and an original D is placed on a predetermined position on the platen glass 22. Then, the scanner unit 21 is moved in the sub-scanning direction relative to the original D placed on the platen glass. Specifically, the scanner unit 21 is moved in the sub-scanning direction, while reading the original D on the platen glass 22 in the main scanning direction, whereby the entire original is read.

The printer apparatus B has the same construction as the printer apparatus B shown in FIG. 3, and therefore explanations thereof will be omitted.

Figure 2A:
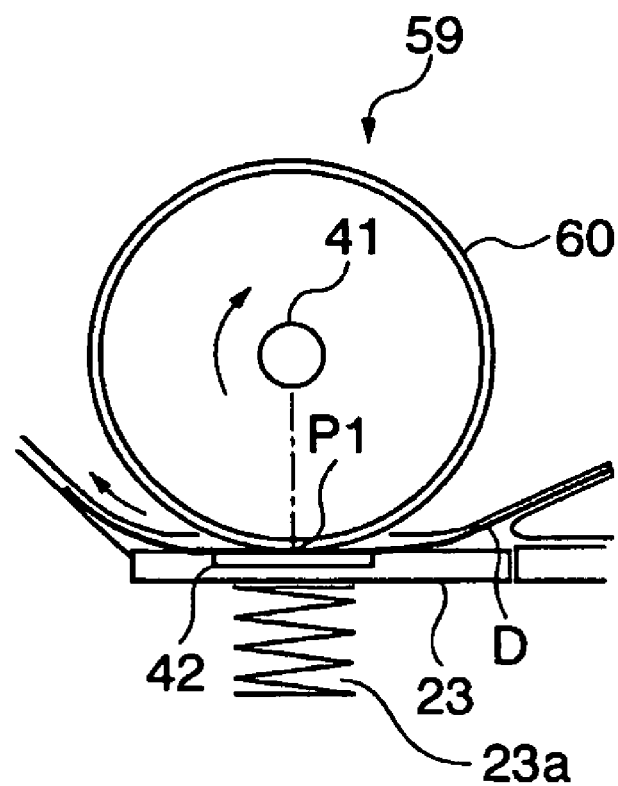
FIG. 2A is a longitudinal section view schematically showing the construction of peripheral components of a scanner unit shown in FIG. 1.
Figure 2B:
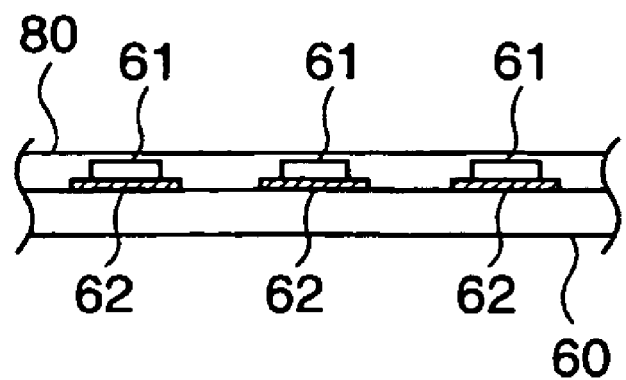
FIG. 2B is a longitudinal section view showing a cut-away part of a cylinder surface of the scanner unit shown in FIG. 1.
Figure 3A:
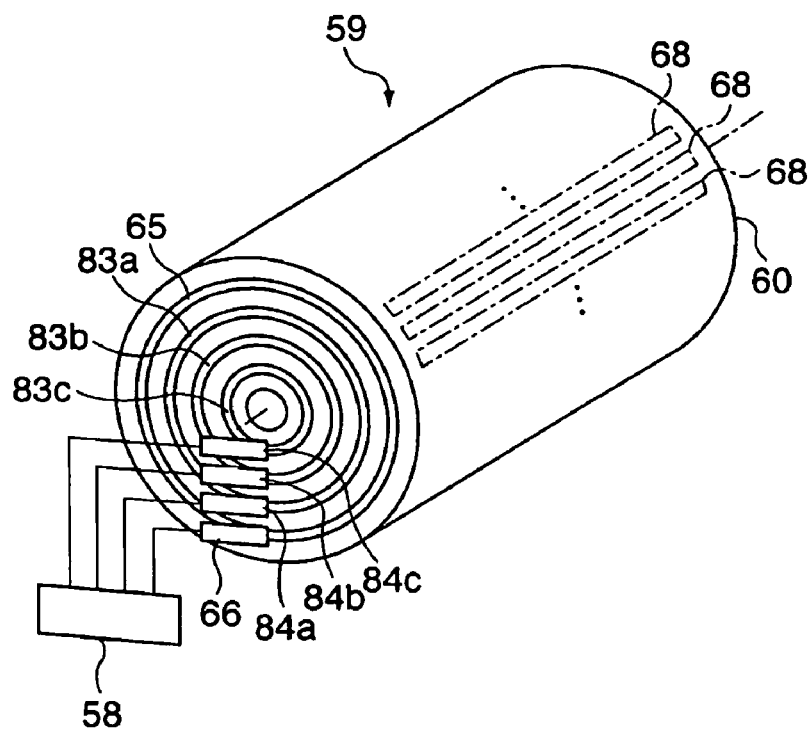
FIG. 3A is a perspective view showing the construction of an essential part of the scanner unit shown in FIG. 1.
Figure 3B:
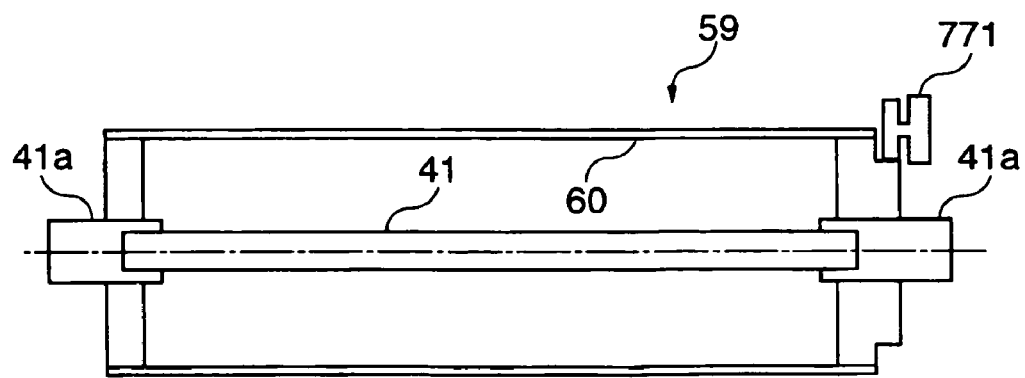
FIG. 3B is a longitudinal section view of the scanner unit shown in FIG. 2.
Figure 4A:
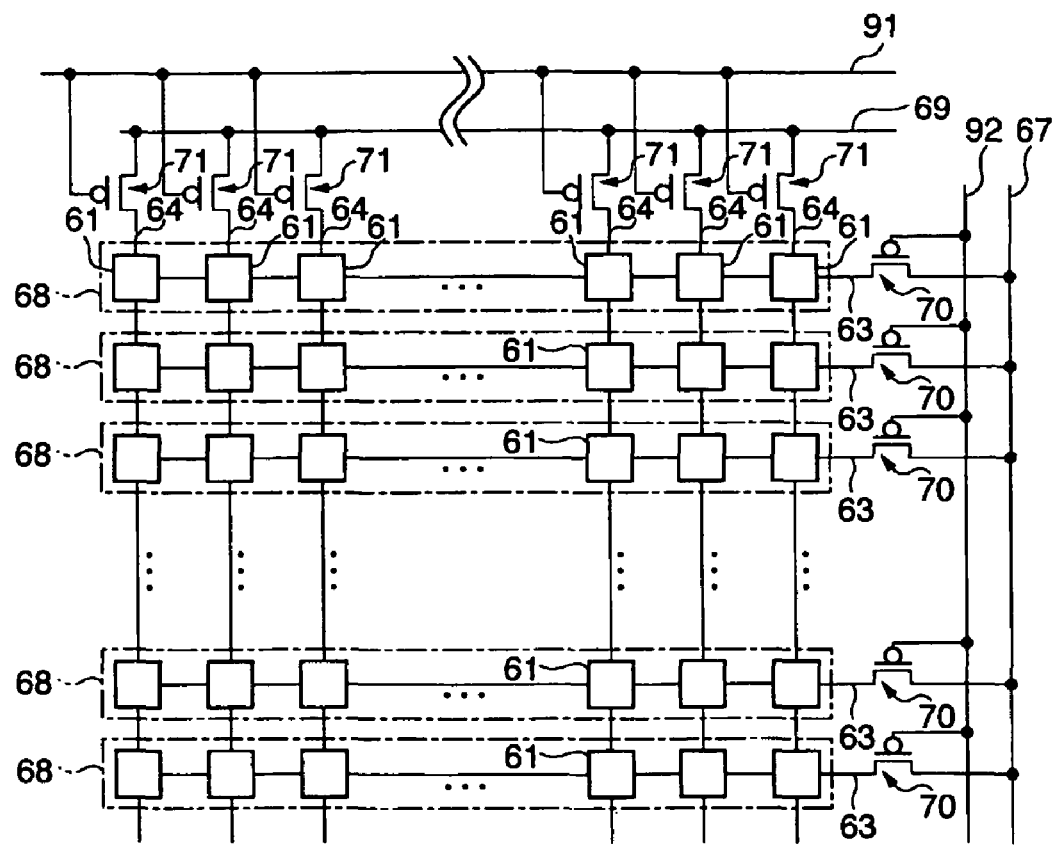
FIG. 4A is a development view showing a state where a plurality of read pixels each comprised of an organic semiconductor are disposed in a matrix.
Figure 4B:
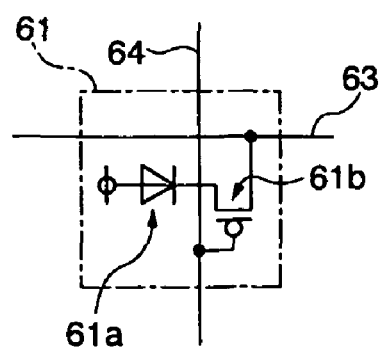
FIG. 4B is a view showing the circuit construction of the read pixels.

Next, with reference to FIGS. 2-4, the scanner unit 59 will be explained in detail. FIG. 2A is a longitudinal section view schematically showing the construction of peripheral components of the scanner unit 59 shown in FIG. 1, and FIG. 2B is a longitudinal section view showing a cut-away part of a cylinder surface of the scanner unit 59 shown in FIG. 1. FIG. 3A is a perspective view showing the construction of an essential part of the scanner unit shown in FIG. 1, and FIG. 3B is a longitudinal section view of the scanner unit shown in FIG. 2. FIG. 4A is a development view showing a state where a plurality of read pixels comprised of organic semiconductors are disposed in a matrix, and FIG. 4B is a View showing the circuit construction of the read pixels.

As shown in FIG. 2A, the scanner unit 59 includes a cylinder 60, as a rotating member, which extends in a direction (main scanning direction) perpendicular to the direction of conveyance of originals D. The cylinder 60 is made of a base material which is optically transparent (including a transparent base material). The cylinder 60 is mounted therein with an elongated lamp 41 extending coaxially with an axis of the cylinder 60. As shown in FIG. 3B, the cylinder 60 is open at opposite ends thereof, and supporting members 41a are attached to the open end portions of the cylinder 60. The supporting members 41a support the lamps 41. Furthermore, the supporting members 41a are mounted to a main body of the ADF 40, and rotatably support the cylinder 60 which is rotated by a driving force generated by the driving motor 771.

As shown in FIG. 2A, the canner unit 59 is rotatably driven by the driving motor 771 in the direction of conveyance of originals D at a circumferential speed nearly equal to the conveying speed of originals D. The pressurizing member 23 facing the scanner unit 59 is urged by a spring member 23a so that the reference member 42 is brought in contact with the outer peripheral surface of the scanner unit 59 with a predetermine pressing force. Each original D passes through between the scanner unit 59 and the reference member 42, and image information on the original D is, read by the scanner unit 59 at an image reading position P1.

As described later, the cylinder 60 has an outer peripheral surface thereof on which a plurality of read pixels 61 are disposed in a matrix. Among the plurality of read pixels 61, those read pixels 61 which are disposed in a line in alignment with the axis of the cylinder 60 cooperate to form a read pixel column 68 that defines a corresponding one of matrix columns. Read pixel columns 68 are disposed circumferentially of the cylinder 60, thereby defining matrix rows.

More specifically, as shown in FIG. 3A, the plurality of read pixel columns 68 are arranged on the outer peripheral surface of the cylinder 60 along the circumferential direction of the cylinder 60 with a predetermined spacing therebetween. As shown in FIG. 2B, each read pixel column 68 includes a plurality of read pixels 61 that are arranged apart from one another by a predetermined distance in the axial direction of the cylinder 60. Each read pixel 61 is provided at its rear surface with a light shielding film 62 that prevents light from the lamp 41 from directly entering to the read pixel 61. The cylinder 60 is formed at its outer peripheral surface with a protective layer 80 for protection of the read pixel 61.

In a developed form, the read pixels 61 on the outer peripheral surface of the cylinder 60 forms a matrix array as shown in FIG. 4A. Those read pixels 61 which are arranged in a line in the direction of matrix columns (and by which one read pixel column 68 is formed) are connected to a word line 63, which is in turn connected through a corresponding word line selector 70 to a column decode line 67. On the other hand, those read pixels 61 which are arranged in a line in the direction of matrix rows are connected to a bit line 64, which is in turn connected through a corresponding bit line selector 71 to a row decode line 69. Each word line selector 70 is controlled in accordance with a signal supplied from a word line selector control line 92. Each bit line selector 71 is controlled in accordance with a signal supplied from a bit line selector control line 91. By controlling the word line selectors 70 and the bit selectors 71, an address designation for the column decode line 67 and row decode lines 69 is performed, making it possible to read an electric current value from the desired read pixel 61.

As shown in FIG. 4B, each read pixel 61 includes an organic photodiode 61a that generates, when receiving light, an electric current value varying depending on a receiving amount of light, and an organic transistor 61b. By a switching operation of the organic transistor 61b, an electric current value generated in the organic photodiode 61a is read out. The read pixel 61 having the just-mentioned construction functions as an optical sensor. The organic photodiode 61a and the organic transistor 61b are each made of an organic semiconductor.

The read pixels 61 made of organic semiconductors make it possible to form, using precision printing technology or the like, a plurality of read pixels 61 and their peripheral circuits on the outer peripheral surface of the cylinder 60.

As shown in FIG. 3A, the scanner unit 59 has one end face thereof formed with a plurality of endless terminals 83a, 83b, 83c, and 65. The terminal 83a is connected to the row decode line 69, the terminal 65 is connected to the column decode line 67, the terminal 83b is connected to the bit line selector control line 91, and the terminal 83c is connected to the word line selector control line 92.

Connecting terminal 84a, 84b, 84c, and 66 are disposed in sliding contact with respective ones of the terminals 83a, 83b, 83c, and 65. Each of the connecting terminal 84a, 84b, 84c, and 66 forms a spring contact, and is electrically connected to an image processing device 58. When the scanner unit 59 rotates, the connecting terminal 84a, 84b, 84c, and 66 are kept in sliding contact with the corresponding terminals 83a, 83b, 83c, and 65, respectively. As a result, even during the rotation of the scanner unit 59, electrical connection is kept maintained between the image processing section 58 and the row decode line 69, column decode line 67, bit line selector control line 91, word line selector control line 92.

The image processing section 58 controls readout of electrical signal (image information) from each of the read pixels 61 of the scanner unit 59. The image processing section 58 subjects the electrical signal read from each read pixel 61 to predetermined processing, whereby image data suitable for being processed by the printer apparatus B is generated, and the generated image data is delivered to the printer apparatus B.

Figure 5:
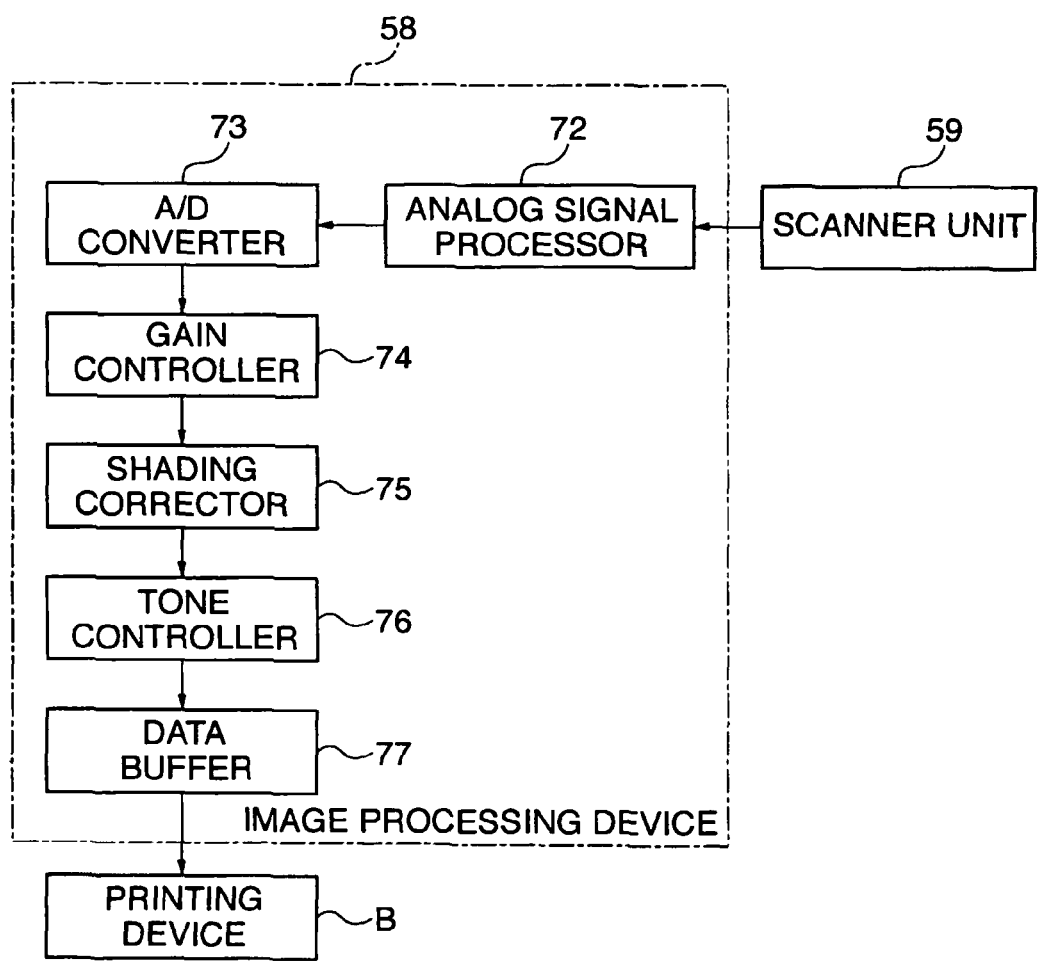
FIG. 5 is a block diagram showing the construction of an image processing section shown in FIG. 3A.

With reference to FIG. 5, the image processing section 58 will be explained in detail. FIG. 5 is a block diagram showing the construction of the image processing section 58 shown in FIG. 3A.

As shown in FIG. 5, the image processing section 58 includes an analog signal processor 72. The analog signal processor 72 performs various corrections such as sensitivity correction on the electrical signals read from the scanner unit 59. Each of the signals corrected by the analog signal processor 72 is converted into a digital image signal by an A/D converter 73. The digital image signal is subjected to various corrections by a gain controller 74, a shading corrector 75, and a tone controller 76. Then, the corrected digital image signal is temporarily held, as image data, in a data buffer 77, and is delivered to the printer apparatus B. The shading corrector 75 performs shading correction on image data associated with each read pixel 61 on the basis of shading data that has been read by the same read pixel from the reference member 42.

Further, the image processing section 58 delivers, to the scanner unit 59, a signal used to control the reading of electrical signals from read pixels 61 of the scanner unit 59. An illustration of a function block therefor is, however, omitted herein.

Next, an explanation will be given of the ADF scanning mode of the image reading apparatus A.

When an instruction for original reading in the ADF scanning mode is given by operating an operating section or the like, in order to first acquire shading data, the driving motor 771 causes the scanner unit 59 to rotate in the original conveyance direction at a circumferential speed nearly equal to the conveying speed of originals D. Then, the scanner unit 59 reads the reference member 42.

In reading the reference member 42, the read pixel column 68 having reached the image reading position P1 receives light reflected from the reference member 42, and generates electric current values varying in accordance with an amount of light received. The organic transistors 61b of the read pixels 61 of the read pixel column 68 are sequentially subjected to switching, and electric current values generated in the organic photodiodes 61a of the read pixels 61 are read out, as electrical signals, through the word line 63 concerned. The read electrical signals are converted into pieces of shading data used for shading correction in the image processing section 58. Each shading data is stored in a memory (not shown), together with address data of the corresponding read pixel 61.

In this manner, pieces of shading data for the corresponding read pixels 61 are acquired each time one read pixel column 68 has reached the image reading position P1, and the pieces of shading data are stored in the memory together with address information. When the scanner unit 59 is rotated for one revolution, therefore, pieces of shading data for all the read pixels 61 of the scanner unit 59 are acquired.

Upon completion of acquiring the shading data for all the read pixels 61, the ADF 40 starts feeding originals D on the original tray 12. Each of the fed originals D is delivered into between the scanner unit 59 and the pressurizing member 23. At this time, the scanner unit 59 is caused to rotate in the original conveyance direction at a circumferential speed nearly equal to the conveying speed of originals D. Then, the scanner unit 59 reads image information on an original D passing through the image reading position P1.

In reading the original D, the read pixel column 68 having reached the image reading position P1 receives light reflected from the original D, and generates electric current values varying depending on amount of light received. Thus, electric current values are generated, which vary in accordance with image information on the original D. By switching the read pixels 61 of the read pixel column 68, the electric current values generated in these read pixels 61 are read out therefrom as electrical signal through the word line 63 concerned.

The read electrical signals are input to the image processing section 58. The image processing section 58 performs various processing, including shading correction and the like, on the electrical signals input thereto, thereby generating pieces of image data that are then delivered to the printer apparatus B.

In the aforementioned ADF scanning mode, the scanner unit 59 is rotatably driven such that its circumferential speed is made nearly equal to the original D conveying speed. Thus, as viewed in the sub-scanning direction, the read pixels 61 hardly move relative to the original D being conveyed. As a result, even if dirt, stain or the like is adhered to the surface of the original D, scanner unit 59 or pressurizing member 23 (reference member 42), a readout image of dirt or stain is not extended in the sub-scanning direction. Accordingly, unlike the prior art, no image streaks due to dirt or stain will be produced, making it possible to obtain a high-quality image.

Second Embodiment

Figure 6:
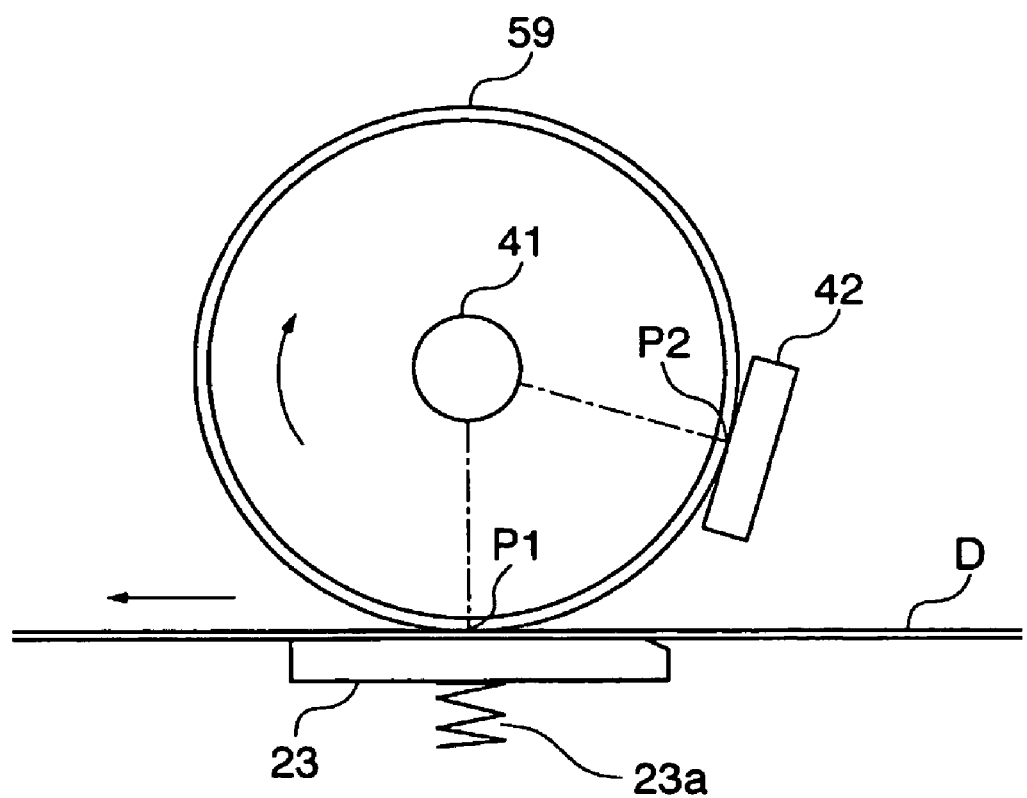
FIG. 6 is a longitudinal section view showing the construction of a scanner unit of an image reading apparatus according to a second embodiment of the present invention.
Figure 7:
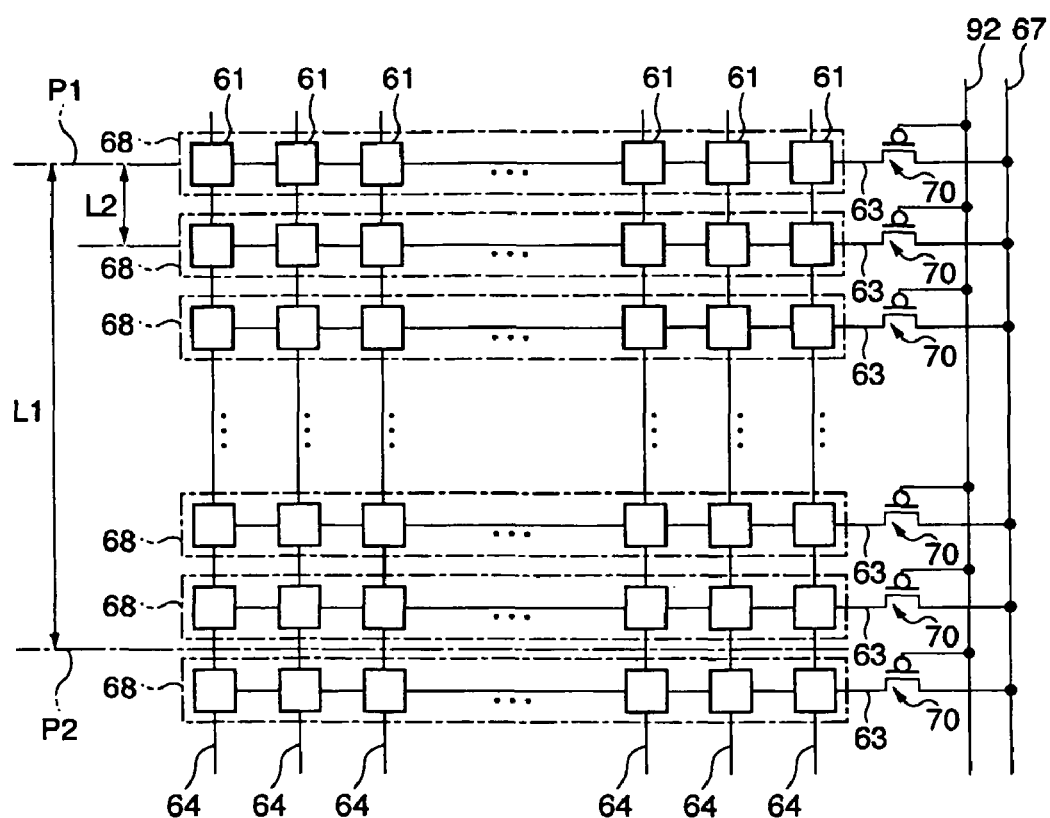
FIG. 7 is a development view showing the array of read pixels in the scanner unit shown in FIG. 6.

Next, with reference to FIGS. 6 and 7, a second embodiment of the present invention will be explained. FIG. 6 is a longitudinal section view schematically showing the construction of an essential part of a scanner unit of an image reading apparatus according to the second embodiment. FIG. 7 is a development view showing an array of read pixels in the scanner unit shown in FIG. 6.

In the first embodiment, the reading of an original is carried out after completion of acquisition of shading data for all the read pixels 61. The present embodiment differs therefrom in that the acquisition of shading data and the reading of an original are carried out in parallel.

As shown in FIG. 6, in the present embodiment, the reference member 42 is not built in the pressurizing member 23 but is provided in another location. The reference member 42 is urged against an outer peripheral surface of the scanner unit 59 with a predetermined pressing force. The position where an original D is read by the scanner unit 59 is called herein as the image reading position P1, whereas the position where the reference member 42 is read is called as the reference member reading position P2.

In that case, as shown in FIG. 7, assuming that a circumferential distance in the scanner unit 59 from the read pixel column 68 having reached the image reading position P1 to the reference member reading position P2 is indicated by L1, the distance L1 is set so as to satisfy the relationship represented by the following equation.

$$L1=(m+\tfrac{1}{2})L2, \text{ where } m \text{ represents a positive integer.}$$

L2 denotes a circumferential distance between adjacent read pixel columns 68.

In this way, the distance L1 is set so as not to be equal to an integral multiple of the circumferential distance L2 between adjacent read pixel columns 68. As a result, when a given read pixel column 68 has reached the image reading position P1, any other read pixel column 68 has not reached the reference member reading position P2 as yet. In other words, a timing in which a given read pixel column 68 has reached the image reading position P1 differs from a timing in which any other read pixel column 68 has reached the reference member reading position P2, which makes it possible to alternately carry out the reading of original D and the reading of the reference member 42. As a result, for every read pixel column 68, it is possible to carry out the reading of the reference member 42 and the reading of an original D in sequence in this order or in the reverse order. As compared to the first embodiment in which the reading of an original D is carried out after completion of acquisition of shading data for all of the read pixels 61, it is possible to shorten the time required for the reading of an original D.

In the present invention, it is possible to erase, immediately upon completion of shading correction on image information obtained from a read pixel column 68, the shading data stored in the memory in association with the just-mentioned read pixel column 68, for which the shading correction has been completed. Thus, it is enough for the memory to have a memory capacity to store shading data of those read pixel columns 68 which are present between the reference member reading position P2 and the image reading position P1 and shading data which are acquired during the processing time for shading correction, making it possible to reduce the memory capacity required for storage of shading data.

During the image reading, there sometimes occur a variation in illuminating light amount of any one of the lamps 41 and a variation in sensitivity in any one of the organic photodiodes 61a. Even in such a case, shading data is updated before the read pixel column 68 has reached the image reading position P1, and therefore, it is possible to obtain shading data to which such variation in illuminating light amount and/or sensitivity is reflected, making it possible to obtain image data closer to image information on the original.

Preferably, the distance between the reference member 42 and the lamp 41 at the reference member reading position P2 should be made equal to the distance between an original D and the lamp 41 at the image reading position P1. This makes the illuminating light amount for the reference member 42 nearly equal to the illuminating light amount for the original D, whereby more accurate shading correction can be carried out.

Third Embodiment

Figure 8:
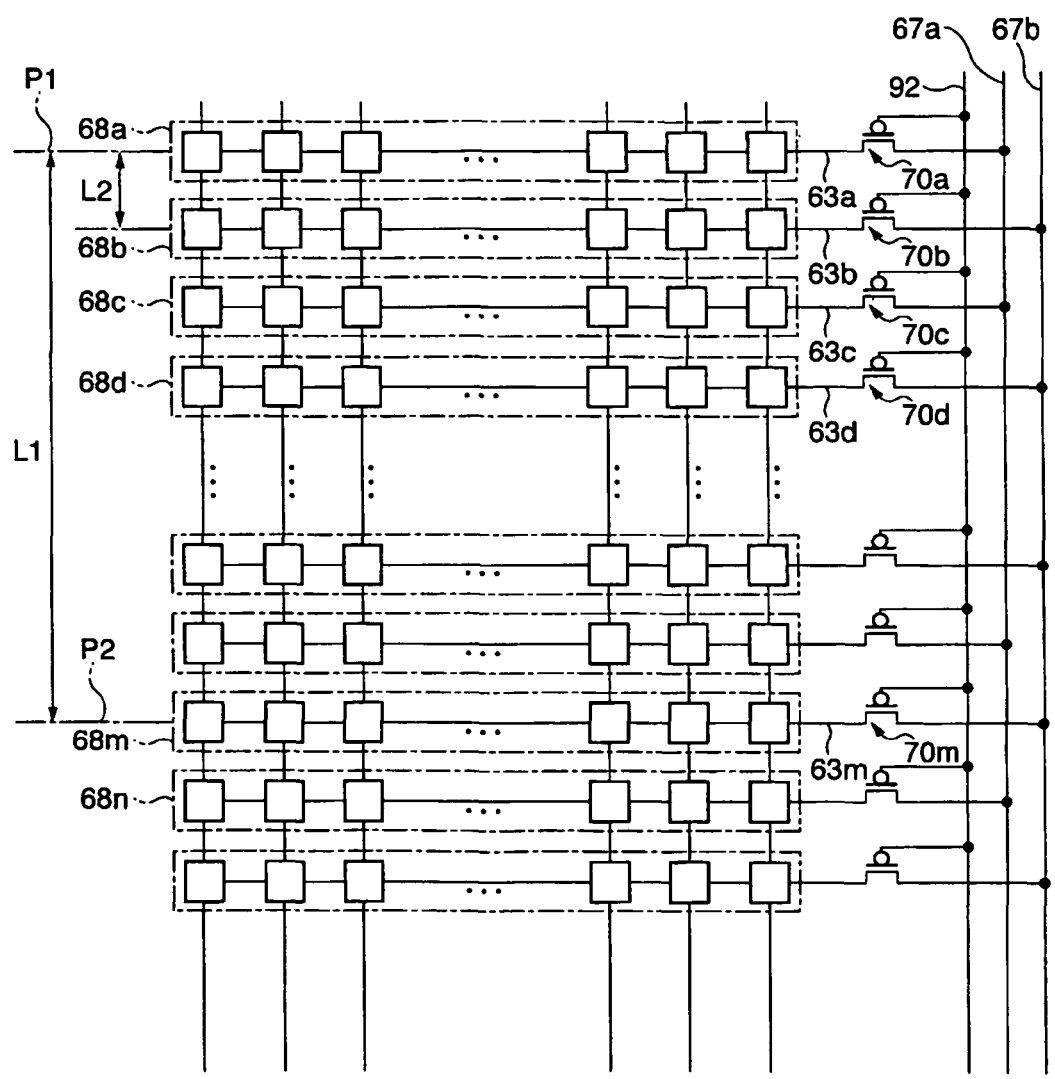
FIG. 8 is a development view showing the array of read pixels in a scanner unit of an image reading apparatus according to a third embodiment of the present invention.
Figure 9:
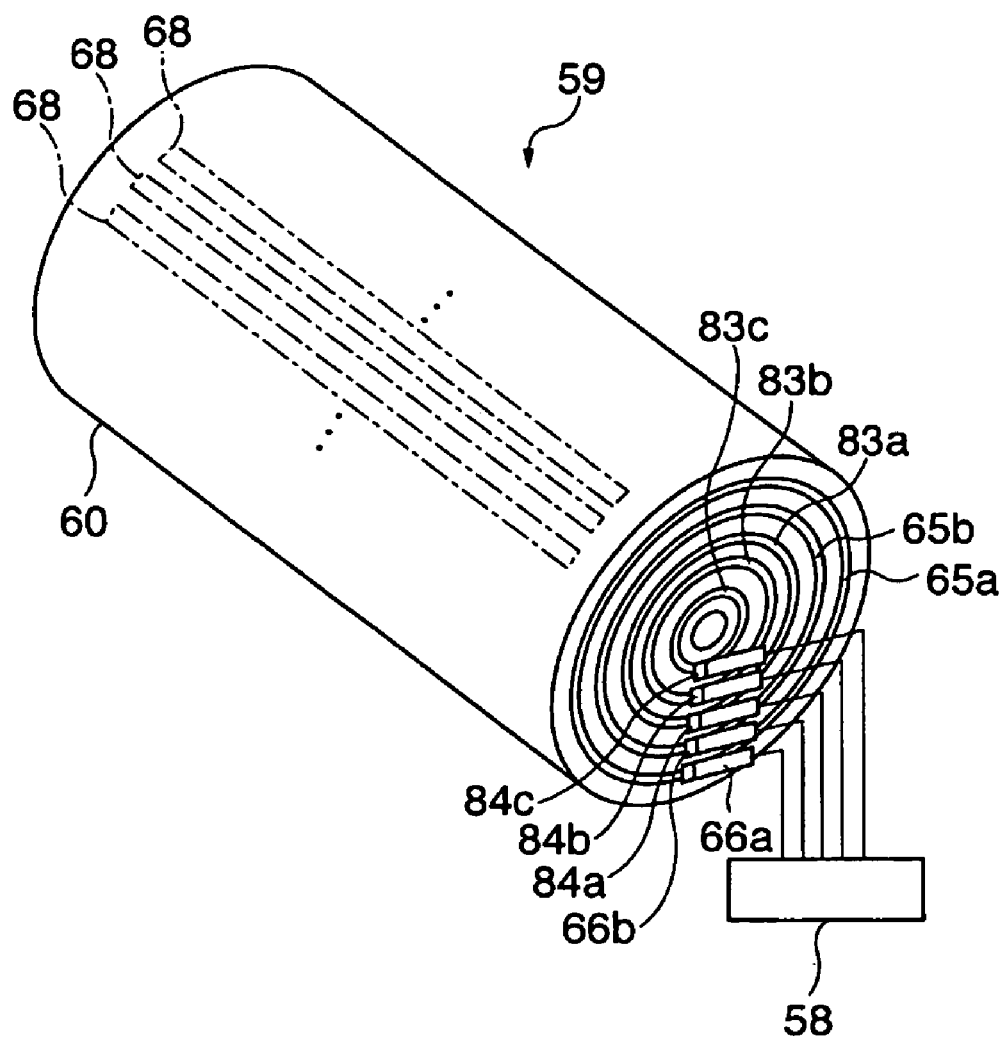
FIG. 9 is a perspective view showing the construction of an essential part of the scanner unit of the image reading apparatus according to the third embodiment of the present invention.

Next, with reference to FIGS. 8 and 9, a third embodiment of the present invention will be explained. FIG. 8 is a development view showing an array of read pixels in a scanner unit of an image reading apparatus according to the third embodiment. FIG. 9 is a perspective view showing the construction of an essential part of the scanner unit of the imager reading apparatus according to the third embodiment.

In the second embodiment, it is required to complete the reading of an original D or the reading of the reference member 42 while the scanner unit 59 rotates half of the distance L2. As a result, the rotating speed of the scanner unit 59 is determined in consideration of switching response of the organic transistor 61b, which imposes a limit in increasing the speed for reading an original.

The present embodiment differs from the second embodiment in that a plurality of row decode lines are provided for word lines to which read pixels 61 are connected and the reading of an original D and the reading of the reference member 42 are performed concurrently. In other respects, the present embodiment is basically the same in construction as the second embodiment.

More specifically, as shown in FIG. 8, a read pixel column 68a is connected to a word line 63a that is connected to the first column decode line 67a. Another read pixel column 68b, which is disposed downstream of and adjacent to the read pixel column 68a in the rotating direction of the scanner unit 59, is connected to a word line 63b to which a second column decode line 67b is connected. There is still another read pixel column 68c which is disposed downstream of and adjacent to the read pixel column 68b as viewed in the rotating direction of the scanner unit 59, the read pixel column 68c being connected to a word line 63c which is in turn connected to the first column decode line 67a. A further read pixel column 68d is disposed downstream of and adjacent to the read pixel column 68c in the rotating direction of the scanner unit 59, the read pixel column 68d being connected to a word line 63d, which is in turn connected to the second column decode line 67b.

Similarly, word lines 63 for other read pixel columns 68 are alternately connected to the first and second column decode lines 67a and 67b.

As shown in FIG. 9, the scanner unit 59 has one end face thereof in which endless terminals 65a, 65b, 83a, 83b, and 83c are provided. The terminal 65a is connected to a column decode line 67a, whereas the terminal 65b is connected to a column decode line 67b. The terminal 83a is connected to a row decode line 69, the terminal 83b is connected to a bit line selector control line 91, and the terminal 83c is connected to a word line selector control line 92. Terminals 66a, 66b, 84a, 84b, and 84c are in sliding contact with the terminals 65a, 65b, 83a, 83b, and 83c, respectively, and each form a spring contact. Each of the terminals 66a, 66b, 84a, 84b, and 84c is connected to the image processing section 58. With this construction, even when the scanner unit 59 rotates, it is possible to maintain connection between the image processing section 58 and the row decode line 69, column decode line 67a, 67b, bit line selector control line 91, and word line selector control line 92.

In the present embodiment, assuming that, as shown in FIG. 8, a circumferential distance in the scanner unit 59 from the read pixel column 68a having reached the image reading position P1 to the reference member reading position P2 is indicated by L1, the distance L1 is set to satisfy the relationship represented by the following equation.

$$L1=mL2, \text{ where } m \text{ represents an odd number not less than 3.}$$

L2 represents a circumferential distance between adjacent read pixel columns 68.

In this manner, the distance L1 is set to be equal to an odd number of times the circumferential distance L2 between adjacent read pixel columns 68, and the reference member 42 is provided at a position corresponding to the reference member reading position P2 that satisfies the distance L1 relative to the image reading position P1.

As a result, when a certain read pixel column 68a reaches the image reading position P1, another read pixel column 68m reaches the reference member reading position P2. In other words, the timing in which the read pixel column 68a reaches the image reading position P1 is equal to the timing in which the read pixel column 68m reaches the reference member reading position P2.

The read pixel column 68a located at the image reading position P1 is connected to the first column decode line 67a by the word line selector 70a, whereby the reading of the image information is carried out. At the same time, the read pixel column 68m located at the reference member reading position P2 is connected to the second column decode line 67b by the word line selector 70b, whereby the reading of the reference member 42 (shading data) is carried out.

As a result, the reading of the image information by the read pixel column 68a may be completed before the next read pixel column 68b reaches the image reading position P1. In other words, according to the present embodiment, the reading of image information may be made within a time period as long as twice the time period in which the image information is read in the second embodiment. Similarly, the reading of the reference member 42 may be completed before the next read pixel column 68n reaches the image reading position P2. Thus, the reading of the reference member 42 may be performed within a time period as long as twice the time period in which the reference member 42 is read in the second embodiment. This relieves the restriction on original reading speed due to the response of the organic transistor 61b, making it possible to increase the original reading speed.

Fourth Embodiment

Figure 10:
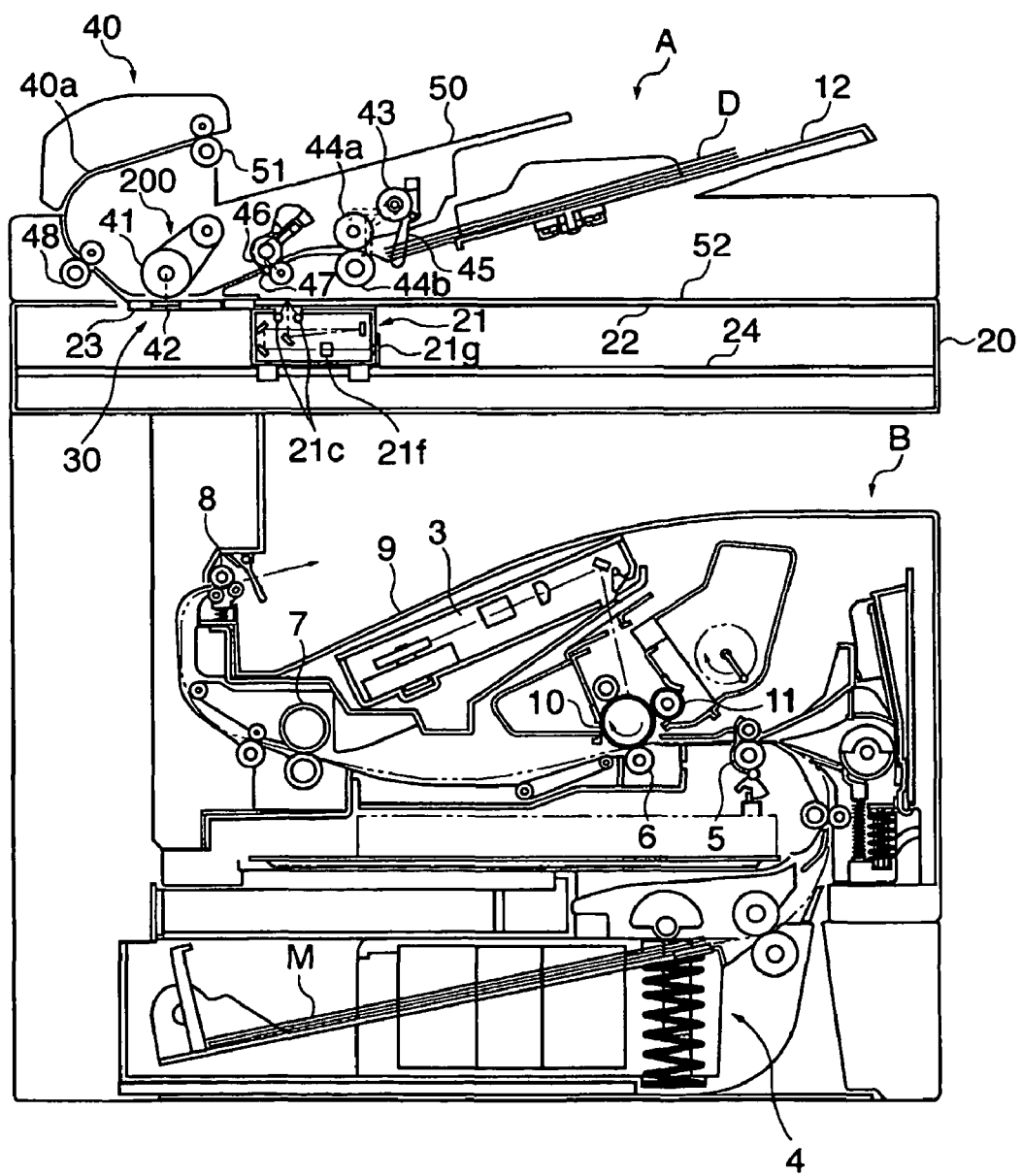
FIG. 10 is a longitudinal section view showing the construction of an image forming apparatus equipped with an image reading apparatus according to a fourth embodiment of the present invention.
Figure 11A:
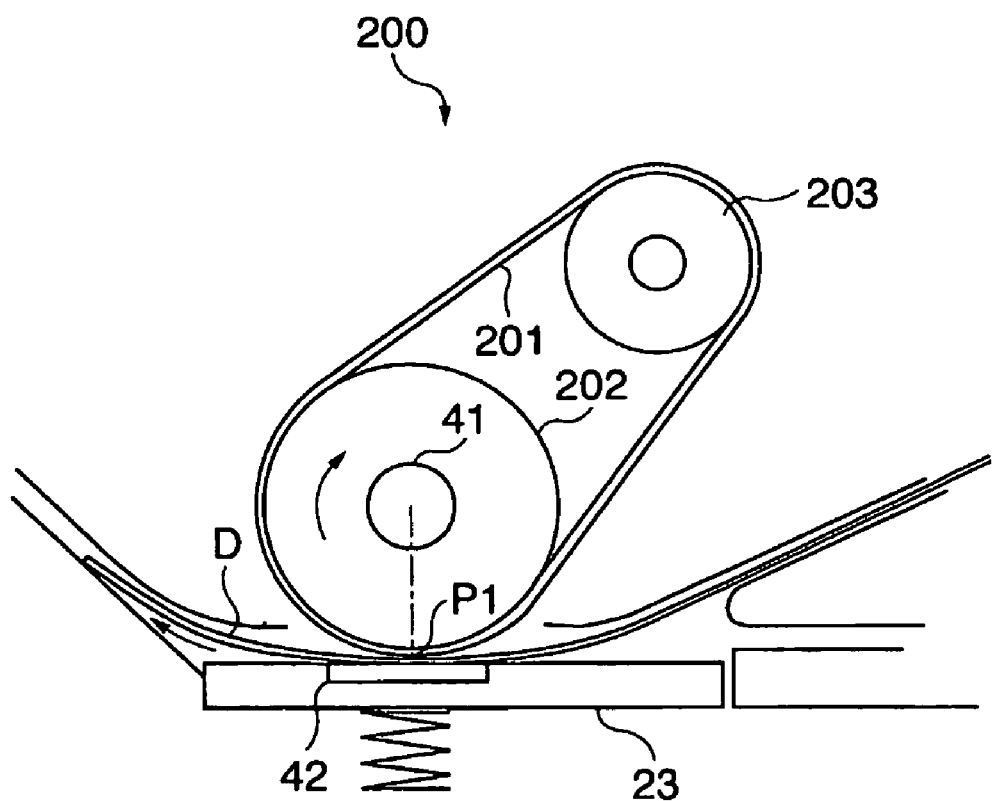
FIG. 11A is a longitudinal section view schematically showing the construction of peripheral components of the scanner unit shown in FIG. 10.
Figure 11B:
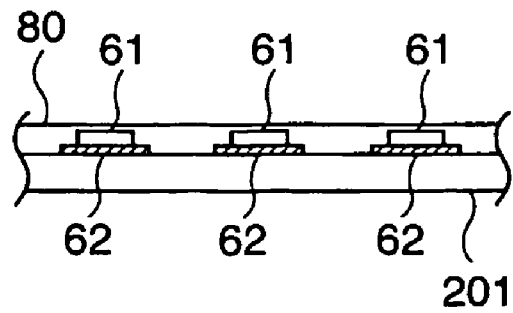
FIG. 11B is a longitudinal section view showing a cut-away part of a belt of the scanner unit shown in FIG. 10.
Figure 12A:
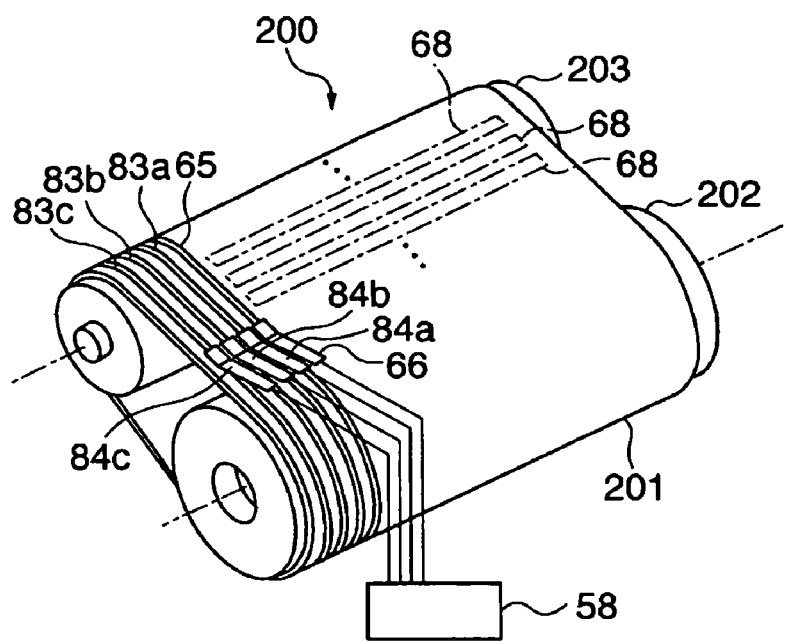
FIG. 12A is a perspective view showing the construction of an essential part of the scanner unit shown in FIG. 10.
Figure 12B:
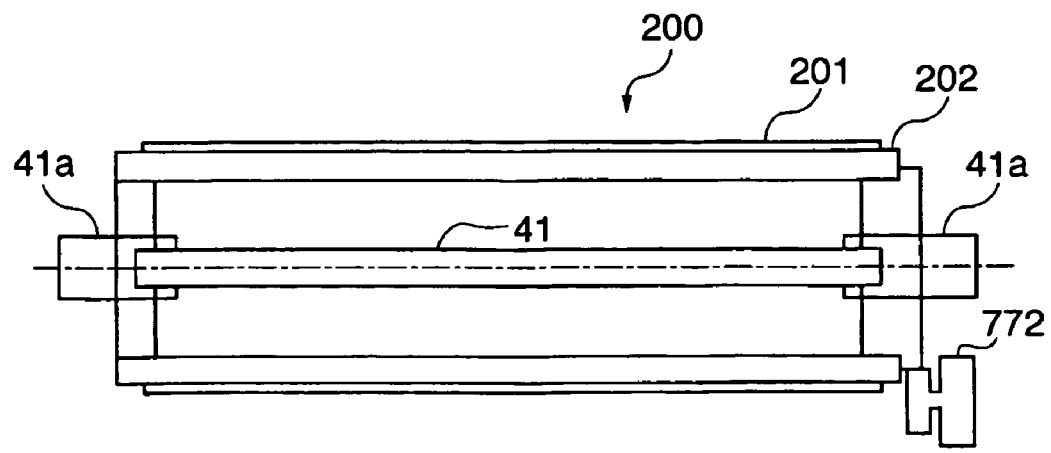
FIG. 12B is a longitudinal section view showing a roller of the scanner unit of FIG. 11.
Figure 13:
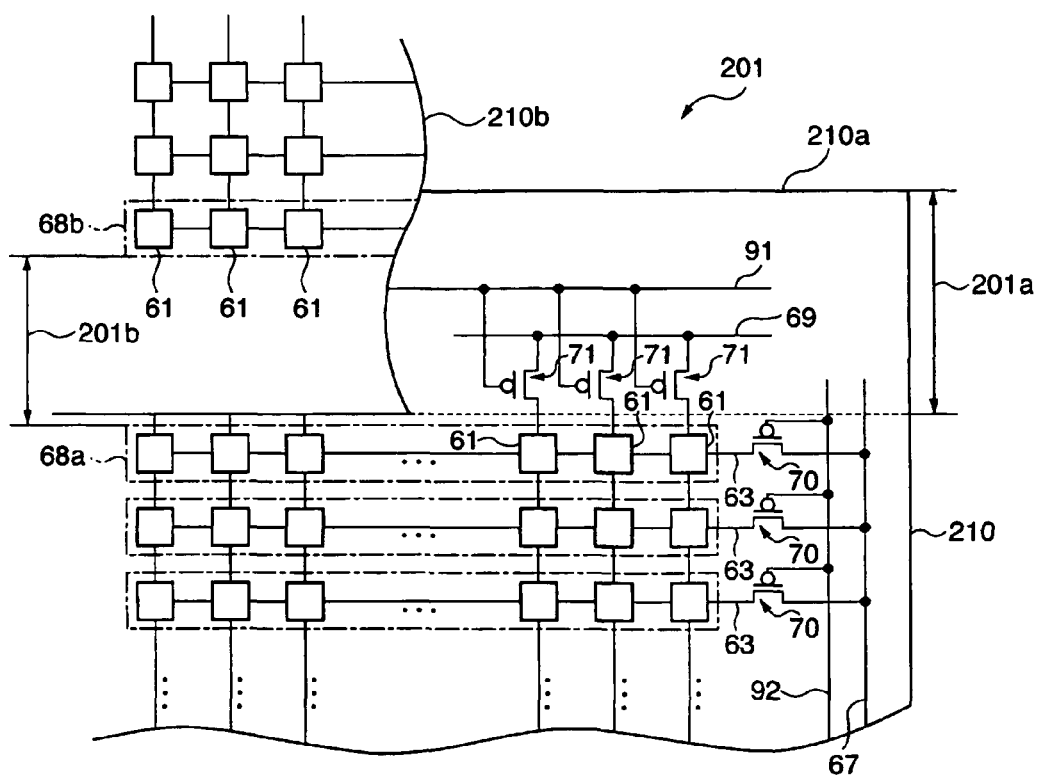
FIG. 13 is a plan view showing, partly cut away, a joining portion of end portions of a belt shown in FIG. 12A.
Figure 14:
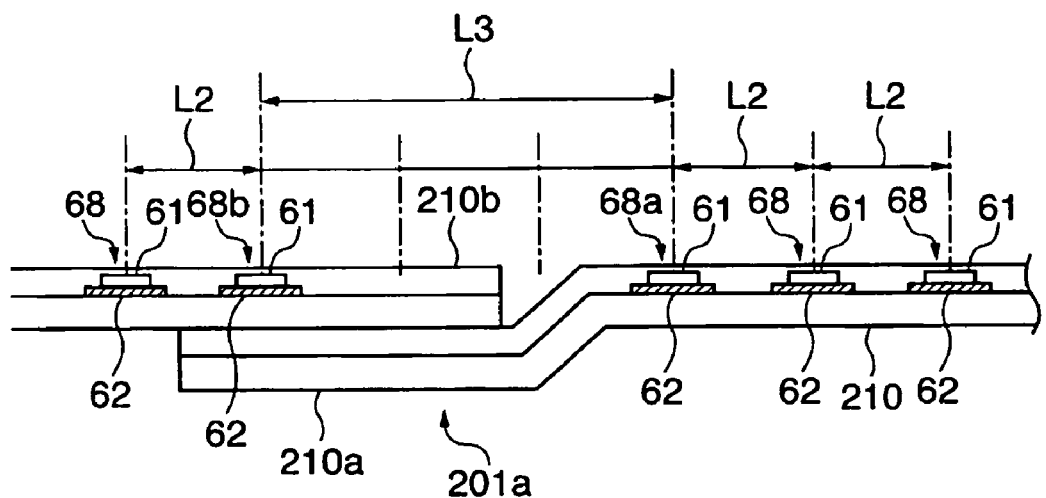
FIG. 14 is a longitudinal section view showing the joining portion of the end portions of the belt shown in FIG. 12A.
Figure 15:
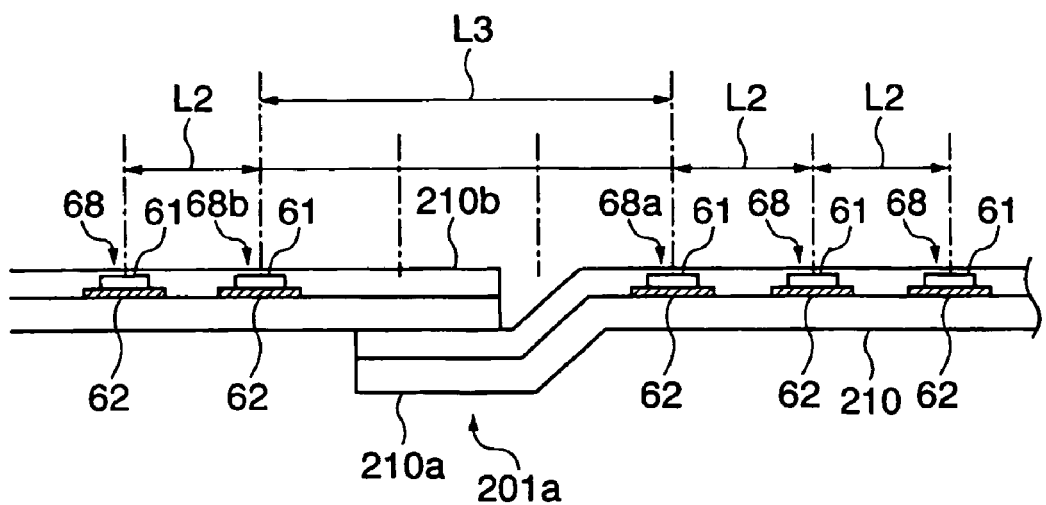
FIG. 15 is a longitudinal section view showing another example of the construction of the joining portion of the end portions of the belt shown in FIG. 12A.

Next, with reference to FIGS. 10-15, a fourth embodiment of the present invention will be explained. FIG. 10 is a longitudinal section view showing the construction of an image forming apparatus equipped with an image reading apparatus according to the fourth embodiment. FIG. 11A is a longitudinal section view schematically showing the construction of peripheral components of the scanner unit 200 shown in FIG. 10, and FIG. 11B is a longitudinal section view showing a cut-away part of a belt of the scanner unit 200 shown in FIG. 10. FIG. 12A is a perspective view showing the construction of an essential part of the scanner unit 200 shown in FIG. 10, and FIG. 12B is a longitudinal section view of a roller of the scanner unit 200 shown in FIG. 11. FIG. 13 is a plan view, partly broken away, a joining portion of end portions of the belt shown in FIG. 12A. FIG. 14 is a longitudinal section view showing the joining portion of the end portions of the belt shown in FIG. 12A. FIG. 15 is a longitudinal section view showing another example of construction of the joining portion between the end portions of the belt shown in FIG. 12A.

The present embodiment is different from the first to third embodiments using the cylindrically formed scanner unit 59 in that it uses a scanner unit having an endless belt on which read pixels are arranged in a matrix.

More specifically, as shown in FIG. 10, the image forming apparatus of the present embodiment is comprised of an image reading apparatus A having a scanner unit 200, and a printer apparatus B that forms an image on a sheet based on image information read by the image reading apparatus A. The image reading apparatus A includes an ADF 40 into which the scanner unit 200 is built. In the present embodiment, like elements similar to corresponding ones of the first embodiment are denoted by like numerals, and explanations thereof will be simplified or omitted.

As shown in FIG. 11A, the scanner unit 200 includes an endless belt 201, and a pair of pulleys 202, 203 between which the belt 201 is stretched. The belt 201 is made of a flexible sheet base material. As shown in FIG. 11B, a plurality of read pixels 61 are provided on the belt 201. The read pixels 61 are arranged on the belt 201 in a pattern that is the same as the matrix array pattern shown in FIG. 4. Further, a wiring for establishing connection between the read pixels 61 has the same construction as that in the first embodiment. Each read pixel 61 has a rear surface thereof formed with a light shielding film 62. A protective film layer 80 for protection of the read pixels 61 is formed in a front surface of the belt 201. The read pixels 61 and their peripheral circuit are formed on an outer peripheral surface of the belt 201, using precision printing technique, for instance.

As shown in FIG. 12A, a plurality of endless terminals 83a, 83b, 83c, and 65 are provided on the belt 201 so as to extend along one edge of the belt 201. The terminal 83a is connected to a row decode line 69, the terminal 65 is connected to a column decode line 67, the terminal 83b is connected to a bit line selector control line 91, and the terminal 83c is connected to a word line selector control line 92 (refer to FIGS. 4A and 4B for details thereof). Connecting terminals 84a, 84b, 84c, and 66 are respectively disposed in sliding contact with the terminals 83a, 83b, 83c, and 65, and are electrically connected to the image processing device 58. Even when the belt 201 rotates, the connecting terminal 84a, 84b, 84c, and 66 are still in sliding contact with the terminals 83a, 83b, 83c, and 65, thus ensuring the connection between the image processing section 58 and the row decode line 69, column decode line 67, bit line selector control line 91, word line selector control line 92.

As shown in FIG. 11A, the pulley 202 is made of a hollow cylindrical member which is optically transparent. The pulley 202 includes a built-in elongated lamp 41 extending coaxially with the axis of the pulley 202. As shown in FIG. 12B, the pulley 202 is open at its both ends to each of which a supporting member 41a is attached. The supporting members 41a support the lamp 41. The supporting members 41a also rotatably support the pulley 202 that is driven by a driving force generated by a driving motor 772.

The pulley 203 is supported by a main body of the ADF 40 and rotatably driven by the driving motor, whereby the belt 201 is driven in a direction shown by an arrow in FIG. 11. At this time, the belt 201 is driven at a circumferential speed nearly equal to the conveying speed of originals D. A pressurizing member 23 is disposed at a location facing the pulley 202 and urged by a spring member 23a so that the reference member 42 is brought in contact with a surface of the belt 201 with a predetermined pressing force.

As in the first embodiment, in the present embodiment, an original D fed from the ADF 40 is read after the reading of the reference member 42 in the image reading position P1 is completed. That is, the reading of the reference member 42 and the reading of the original D are performed at the same reading position (image reading position P1). The respective reading operations are basically the same as those in the first embodiment.

Next, with reference to FIGS. 13 and 14, an explanation will be given of a joining portion where one end portion of the belt 201 is joined to another end portion thereof.

As shown in FIG. 13, the belt 201 is formed by a sheet base material 210 having a surface thereof on which a plurality of read pixels 61 are disposed in a matrix, with one end portion 210a of the sheet base material 210 and another end portion 210b thereof are superimposed and joined to each other. In the joining portion 201a of the belt 201, there is a part 201b where no read pixel column 68 is present (hereinafter referred to as the missing portion). It is assumed here that the missing portion 201b is a region between the read pixel column 68b and the read pixel column 68a.

The missing portion 201b has a length longer than a spacing between other read pixel columns 68, as viewed in the longitudinal direction of the belt. As a result, at the time of reading an original, image information for the missing portion 201b is absent. Thus, interpolation processing to generate image information for the missing portion 201b is carried out based on pieces of image information read by the read pixel columns 68a, 68b between which the missing portion 201b is interposed. The interpolation processing is implemented by the image processing section 58, making it possible to suppress disorder of image to a minimum, which would otherwise be caused due to the presence of missing image information in the missing portion 201b, whereby the image reading can be carried out without any practical trouble.

More specifically, the one end portion 210a of the sheet base material 210 constituting the belt 201 is formed with a row decode line 69, a bit line selector control line 91, and a bit line selector 71. Thus, the one end portion 210a and another end portion 210b are superimposed and joined to each other such that the row decode line 69, the bit line selector control line 91, and the bit line selector 71 are interposed between the read pixels 68a and 68b. It should be noted that these end portions 210a, 210b are superimposed such that the one end portion 210a is disposed below the other end portion 210b. With this construction, the length of the missing portion 201b in the joining portion 201a can be shortened. As a result, a region which requires the interpolation of image information can be made smaller, and therefore, image obtained using interpolation can be made closer to an actual image.

As shown in FIG. 14, it is assumed here that a distance between the read pixel columns 68a, 68b between which the missing portion 201b in the joining portion 201a of the belt 201 is interposed is indicated by L3. Preferably, the distance L3 be set so as to be equal to an integer multiple of a distance L2 between adjacent read pixel columns 68. In that case, when the interpolation is implemented based on other image information to obtain image information for the joining portion 201a, the obtained image information is not expanded and contracted.

According to the present embodiment, in the ADF scanning mode, the belt 201 of the scanner unit 200 is rotatably driven by the pulleys 202 and 203, and when an original D passes through between the belt 201 and the pressurizing member 23, the original D is read in the main scanning direction by a read pixel column 68 of the belt 201. Then, the thus read image information is input into the image processing section 58. The image processing section 58 subjects the input image information to shading correction or other corrections, thereby generating image data that can be processed by the printer apparatus B.

The belt 201 is rotatably driven at a circumferential speed nearly equal to the conveying speed of originals D, and accordingly, as in the scanner unit 59 of the first embodiment, the read pixel column 68 (read pixel 61) hardly moves in the sub-scanning direction relative to an original. For this reason, as in the first embodiment, even if dirt or stain is adhered to the surface of the original D or the belt 201, image strakes due to dirt or stain never be produced.

In the present embodiment, an amount of light irradiated onto an original D from the lamp 41 via the joining portion 201a of the belt 201 (part between the read pixel column 68a and 68b) is smaller than those irradiated onto other parts of the original. The illuminating light amount for the original D when the original D is read by the read pixel column 68a or, 68b, especially read by the read pixel column 68b, is slightly smaller than when it is read by any other read pixel column 68. This is because the end portion 210a overlaps that part of the end portion 210b in which the read pixel column 68b is present.

In order to make an amount of light illuminating an original D uniform among all the read pixel columns 68 of the belt 201 that read the original D, a joining structure shown by way of example in FIG. 15 may be adopted. In that case, no read pixel column 68 is proved at part corresponding to the joining portion 201a, whereby an amount of light illuminating an original D can nearly be equal for all the read pixel columns 68.

Fifth Embodiment

Figure 16:
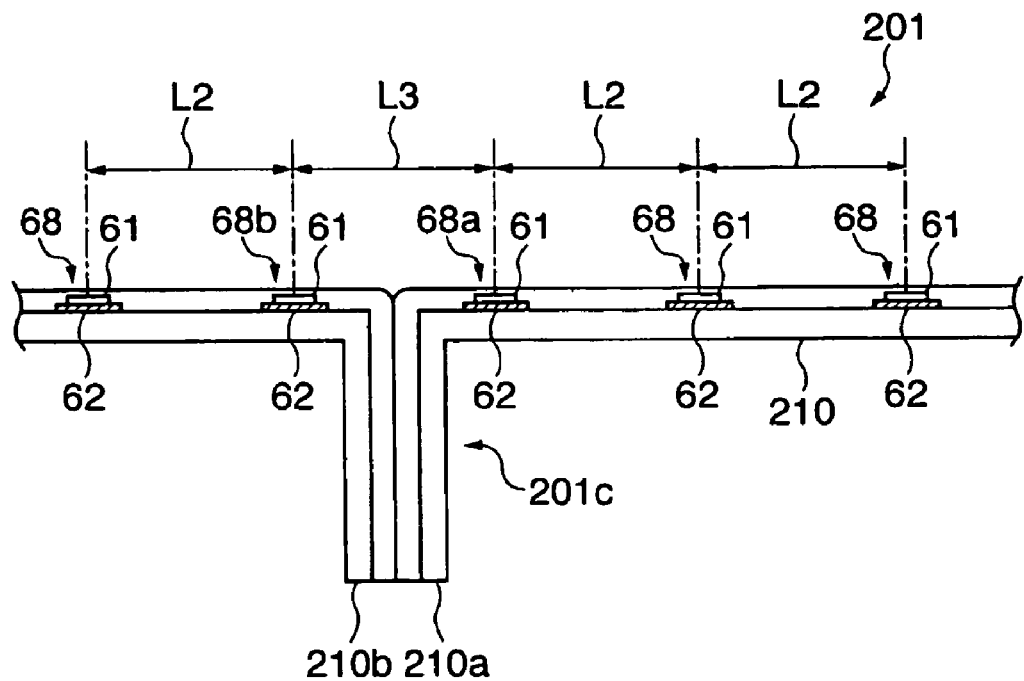
FIG. 16 is a longitudinal section view showing a joining portion of a belt in an image reading apparatus according to a fifth embodiment of the present invention.

Next, a fifth embodiment of the present invention will be explained with reference to FIG. 16. FIG. 16 is a longitudinal section view showing a joining portion of a belt of an image reading apparatus according to the fifth embodiment.

As shown in FIG. 16, in the present embodiment, one end portion 210a of a sheet base material 210 and another end portion 210b thereof are bent in forming the endless belt 201, and the bent end portions 210a, 210b are superimposed so as to face each other and then joined together, whereby the endless belt 201 is formed.

A plurality of read pixel 61 are arranged in a matrix on a surface of the sheet base material 210, and a plurality of read pixel column 68 are formed along a longitudinal direction of the sheet base material 210. It is assumed here that a row decode line 69, a bit line selector control line 91, and a bit line selector 71 are formed in the end portion 210a.

With this joining structure, the belt 201 can be formed, without forming the missing portion having no read pixel columns 68 which is required in the fourth embodiment. More specifically, it is assumed here that a distance between the read pixel columns 68a and 68b between which the joining portion 201c at which the bent end portions 210a, 210b are joined to each other is interposed is indicated by L3 and that a distance between adjacent read pixel columns 68 is indicated by L2. The distances L3 and L2 can be made equal to each other by adjusting lengths of the end portions 201a, 201b which are bent and which can be formed with no read pixel 61. This eliminates the provision of a missing portion having no read pixel columns 68. Therefore, the interpolation of image information is unnecessary to be carried out, unlike the fourth embodiment.

A light amount irradiated onto an original D from the lamp 41 through the joining portion 201c (part between the read pixel columns 68a and 68b) of the belt 201 is very slightly smaller than those irradiated onto other portions. Such reduction in the illuminating light amount on the original D due to the presence of the joining portion 201c is negligible. This indicates that the illuminating light amount on the original D can be made approximately equal for all the read pixel columns 68. It should be noted that it is sufficient that the joining portion 201c has a length short enough to prevent interference between the joining portion and the pulleys 202, 203. As shown in FIGS. 14 and 15 relating to the fourth embodiment, the joining portion may be superimposed on the end portion 210.

In the fourth and fifth embodiments, the reading of the reference member and the reading of an original D are carried out in the same position (image reading position P1). Instead, as in the second embodiment, the acquisition of shading data (reading of the reference member 42) and the reading of an original D may be made concurrently. In that case, the fourth and fifth embodiments are modified such that the reference member 42 and the pressurizing member 23 are disposed at different positions so that the reference member 42 may be read in a position different from the image reading position P1 where the original D is read.

In the following, a sixth embodiment of the present invention will be explained.

Sixth Embodiment

An image forming apparatus equipped with an image reading apparatus according to the present embodiment is basically the same in construction as the first embodiment, and therefore, an explanation thereof will be omitted.

Figure 17:
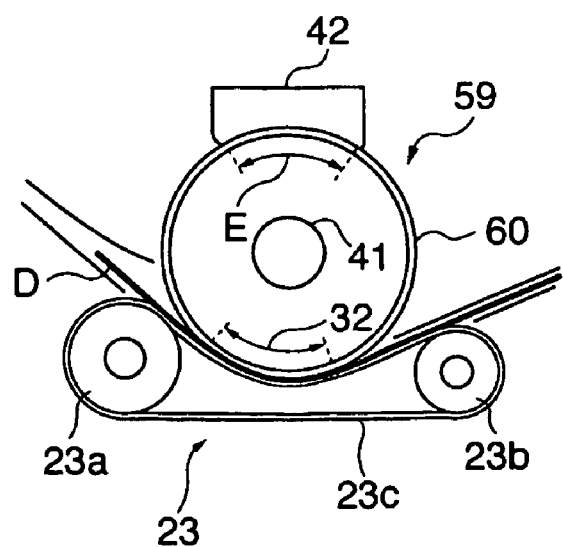
FIG. 17 is a longitudinal section view schematically showing the construction of peripheral components of a scanner unit of an image reading apparatus according to a sixth embodiment of the present invention.
Figure 18A:
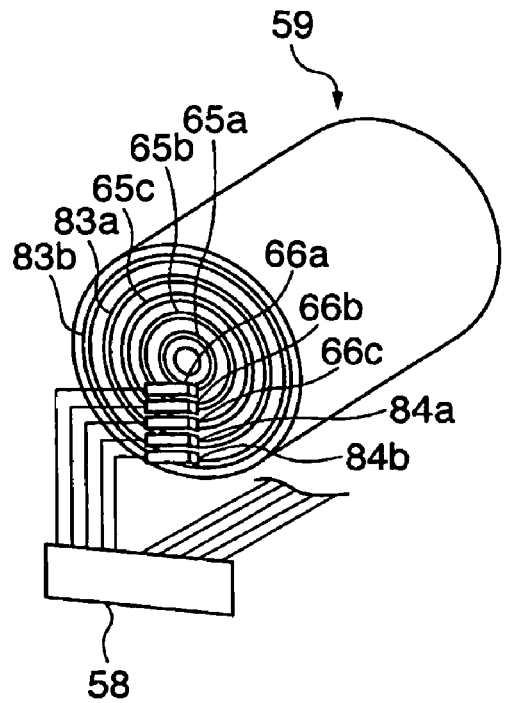
FIG. 18A is a perspective view showing the construction of connection between one end portion of the scanner unit and an image processing section.
Figure 18B:
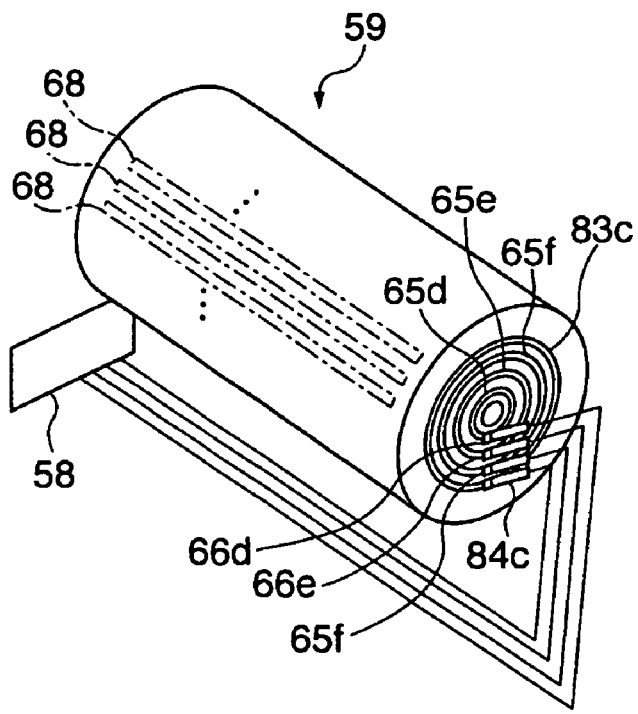
FIG. 18B is a perspective view showing the construction of connection between another end portion of the scanner unit and the image processing section.
Figure 19:
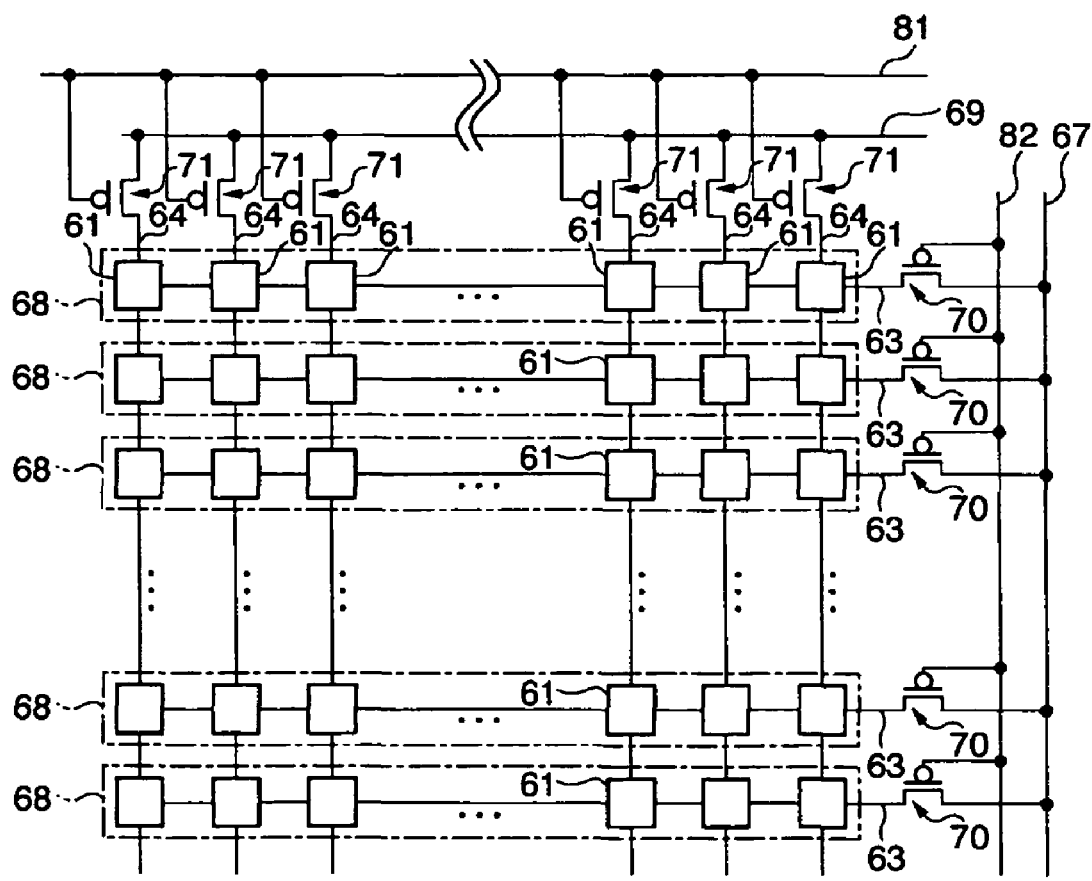
FIG. 19 is a view showing the construction of an array of a plurality of read pixels and a peripheral circuit thereof.
Figure 20:
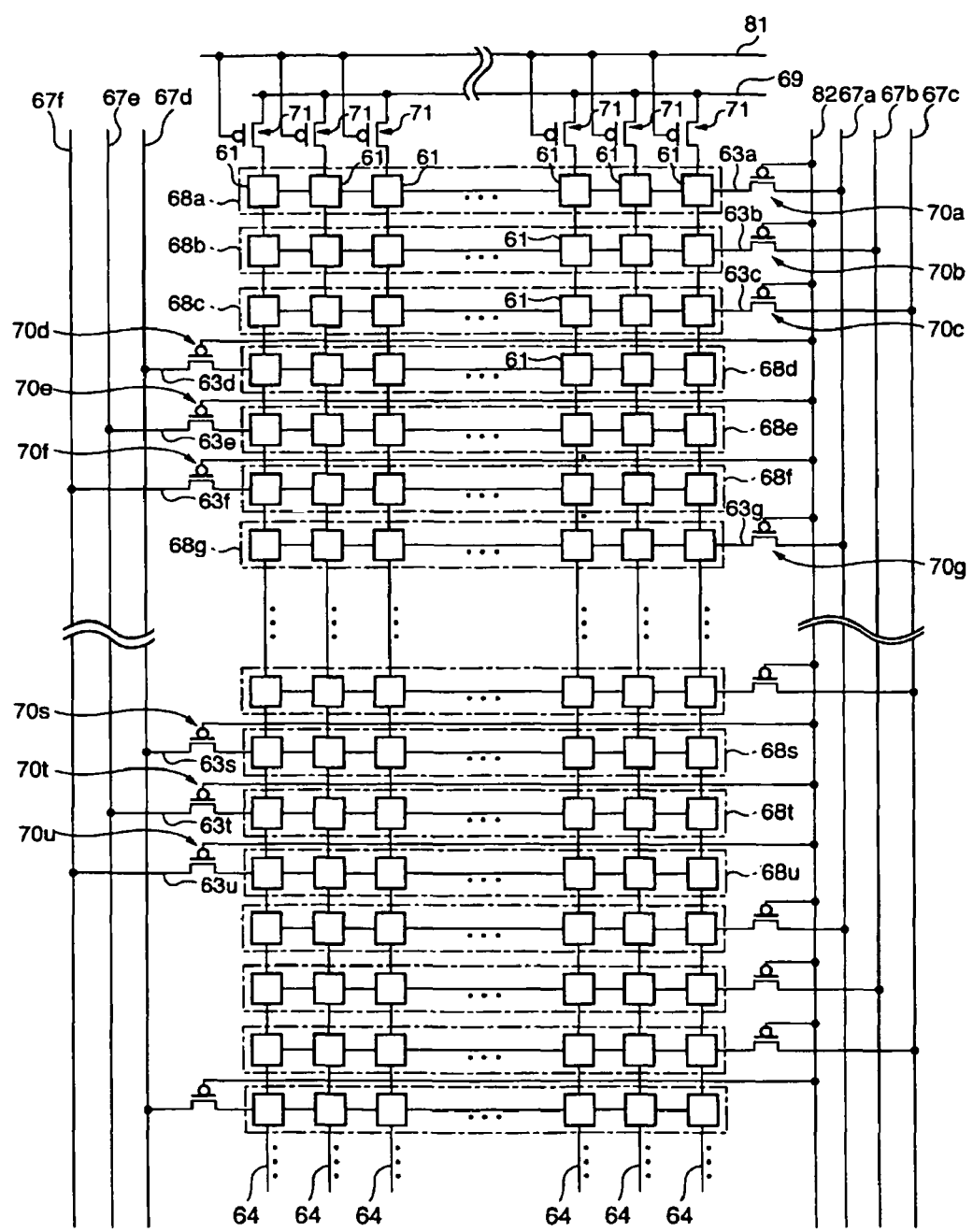
FIG. 20 is a view showing another construction of array of a plurality of read pixels and a peripheral circuit thereof that are alternative to those shown in FIG. 19.

Next, with reference to FIGS. 17-20, a scanning unit 59 of the image reading apparatus according to the present embodiment will be explained in detail. FIG. 17 is a longitudinal section view schematically showing the construction of peripheral components of the scanner unit 59. FIG. 18A is a perspective view showing the construction of connection between one end portion of the scanner unit and the image processing section, and FIG. 18B is a perspective view showing the construction of connection between another end portion of the scanner unit shown in FIG. 1 and the image processing section. FIG. 19 is a view showing the construction of an array of a plurality of read pixels and their peripheral circuit. FIG. 20 is a view showing the construction of an array of a plurality of read pixels and their peripheral circuit that are alternative to those shown in FIG. 19.

The scanner unit 59 is constructed in basically the same manner as the scanner unit 59 of the first embodiment shown in FIGS. 2A to 4B. Specifically, as shown in FIG. 17, the scanner unit 59 of the present embodiment includes a cylinder 60 extending in a direction perpendicular to the conveying direction of originals D (main scanning direction) and made of a base material that is optically transparent. An elongated lamp 41 is built in the cylinder 60. The cylinder 60 has opposite open end portions thereof mounted with supporting members 41a that support a lamp 41 (FIG. 3B). The scanner unit 59 is rotatably driven by a driving force transmitted from a driving motor, in the direction of conveying originals D at a circumferential speed nearly equal to a conveying speed of the originals D.

Unlike the pressurizing portion 23 according to the first embodiment shown in FIG. 2A, a pressurizing portion 23 includes a pair of pulleys 23a, 23b, and a belt 23c stretched between the pulleys 23a, 23b as shown in FIG. 17. A part of the belt 23c is made in contact with an outer peripheral surface of the cylinder 60 of the scanner unit 59, whereby a nip portion 32 by which an original D is held and conveyed is formed between the part of the belt and the outer peripheral surface of the cylinder 60 in contact therewith. Thus, the original being conveyed is brought in face-contact with the outer peripheral surface of the cylinder 60 by the pressurizing portion 23 acting as a pressurizing device. The nip portion 32 has a predetermined length which is set so as to make an original D in adequately close contact with the outer peripheral surface of the cylinder 60. The belt 23c is rotated with rotation of the scanner unit 59.

A reference member 42 is disposed to face the outer peripheral surface of the cylinder 60. A surface of the reference member 42 on the side facing the cylinder 60 is formed into a shape following the outer peripheral surface of the cylinder 60. A region E in which the reference member 42 and the cylinder 60 face each other has a predetermined length that is set such that the reference member 42 is effectively read by the scanner unit 59, thereby ensuring that shading data can be obtained with reliability.

As in the first embodiment shown in FIGS. 3A and 3B, a plurality of read pixels 61 (FIG. 2B) are disposed in a matrix on the outer peripheral surface of the cylinder 60.

More specifically, as shown in FIG. 18B, a plurality of read pixel columns 68 are arranged on the outer peripheral surface of the cylinder 60 along a circumferential direction of the cylinder, with a spacing between the read pixel columns. Each read pixel column 68 includes a plurality of read pixels 61. These read pixels 61 are apart from one another with a spacing therebetween in the axial direction of the cylinder 60. A light shielding film 62 for preventing light from the lamp 41 from directly entering the read pixel 61 is provided in a rear surface of each read pixel 61, and a protective layer 80 for protection of the read pixel 61 is formed on the outer peripheral surface of the cylinder 60.

The array of the read pixels 61 on the outer peripheral surface of the cylinder 60 can be developed into a matrix array as shown in FIG. 19. This matrix array is nearly the same as that shown in FIG. 4A. Specifically, those read pixels 61 (forming one read pixel column 68) which are arranged in a line in the direction of matrix column are connected to a word line 63 and connected via a word line selector 70 to a column decode line 67. Those read pixels 61 which are arranged in a line in the direction of matrix row are connected to a bit line 64 and connected via a bit line selector 71 to a row decode line 69. The word line selector 70 is not controlled in accordance with a signal supplied from the word line selector control line 92 shown in FIG. 4A, but controlled in accordance with a signal supplied from a column selector line 82. The bit line selector 71 is not controlled in accordance with a signal supplied from the bit line selector control line 91 shown in FIG. 4A, but controlled in accordance a signal supplied from the row selector line 81. By controlling the word line selectors 70 and the bit line selectors 71, a desired column decode line 67 and a desired row decode line 69 are address-designated, whereby an electrical current value of a predetermined read pixel 61 can be read out.

Each read pixel 61 is constructed similarly to those shown in FIG. 4B, and therefore an explanation thereof will be omitted.

In the present embodiment, a circuit construction is adopted, in which a plurality of column decode line 67 are provided as shown in FIG. 20. This is intended to simultaneously carry out the reading of the original D and the reading of the reference member 42. Each read pixel 61 has the same construction as that shown in FIG. 4B.

It is assumed here that read pixel columns 68a, 68b, - - -, 63s, 63t, - - -, which are each formed by read pixels 61 arranged in a line in the column direction, are arranged in this order toward the downstream direction of the scanner unit 59. A word line 63a connected to the read pixel column 68a is connected via a word line selector 70a to a first column decode line 67a. A word line 63b connected to the read pixel column 68b adjacent to the read pixel column 68a is connected via a word line selector 70b to a second column decode line 67b. A word line 63c connected to a read pixel column 68c is connected through a word line selector 70c to a third column decode line 67c. A word line 63d connected to a read pixel column 68d is connected through a word line selector 70d to a fourth column decode line 67d. A word line 63e connected to a read pixel column 68e is connected through a word line selector 70e to a fifth column decode line 67e. A word line 63f connected to a read pixel column 68f is connected through a word line selector 70f to a sixth column decode line 67f. Further, a word line 63g connected to a read pixel column 68g, which is disposed adjacent on the downstream side in the rotating direction of the cylinder 60 to the read pixel column 68f, is connected through a word line selector 70g to the first column decode line 67a.

Similarly, each word line 63 connected to a corresponding read pixel column 68 is connected in order to an associated one of the column decode lines 67a to 67f.

In the case of adopting the circuit construction as shown in FIG. 20, the scanner unit 59 is provided at its one end face with a plurality of endless terminals 83a, 83b, 65a, 65b, and 65c as shown in FIG. 18A. The terminal 83a is connected to a row decode line 69, the terminal 83b is connected to a row selector control line 81, the terminal 65a is connected to the first column decode line 67a, the terminal 65b is connected to the second column decode line 67b, and the terminal 65c is connected to the third column decode line 67c.

Connecting terminal 84a, 84b, 66a, 66b, and 66c are in sliding contact with the terminals 83a, 83b, 65a, 65b, and 65c, respectively. Each of the connecting terminals 84a, 84b, 66a, 66b, and 66c constitutes a spring contact, and is electrically connected to the image processing device 58.

As shown in FIG. 18B, the scanner unit 59 is provided at its another end face with a plurality of endless terminal 65d, 65e, 65f, and 83c. The terminal 65d is connected to the fourth column decode line 67d, the terminal 65e is connected to the fifth column decode line 67e, and the terminal 65f is connected to the sixth column decode line 67f. The terminal 83c is connected to the column selector line 82.

Connecting terminal 66d, 66e, 66f, and 84c are in sliding contact with the terminals 65d, 65e, 65f, and 83c. Each of these connecting terminal 66d, 66e, 66f, and 84c forms a spring contact, and is electrically connected to the image processing section 58.

Even when the scanner unit 59 rotates, the connecting terminal 84a to 84c and 66a to 66f are kept in sliding contact with the terminals 83a to 83c and 65a to 65f, respectively. As a result, even during the rotation of the scanner unit 59, the connection is maintained between the image processing section 58 and the row decode line 69, the first to sixth column decode lines 67a to 67e, row selector line 81 and column line selector 92.

The image processing section 58 controls the is reading of electrical signals (image information) from the read pixels 61 of the scanner unit 59, and subjects the electrical signals read from the read pixels 61 to predetermined processing to thereby generate image data suitable for being processed by the printer apparatus B. The generated image data is delivered to the printer apparatus B.

The image processing section 58 is constructed in the same manner as that shown in FIG. 5, and an explanation thereof will be omitted.

Figure 21:
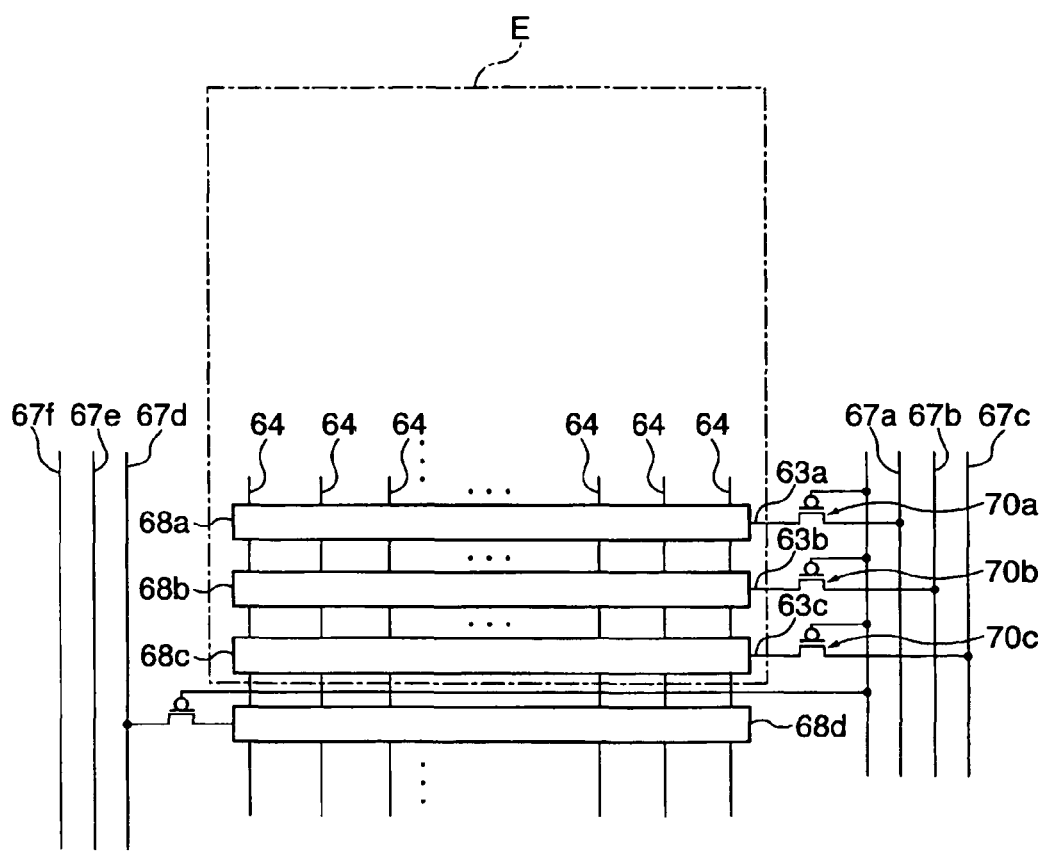
FIG. 21 is a view showing movement of read pixel columns in a region where the scanner unit and a reference member face each other.
Figure 22:
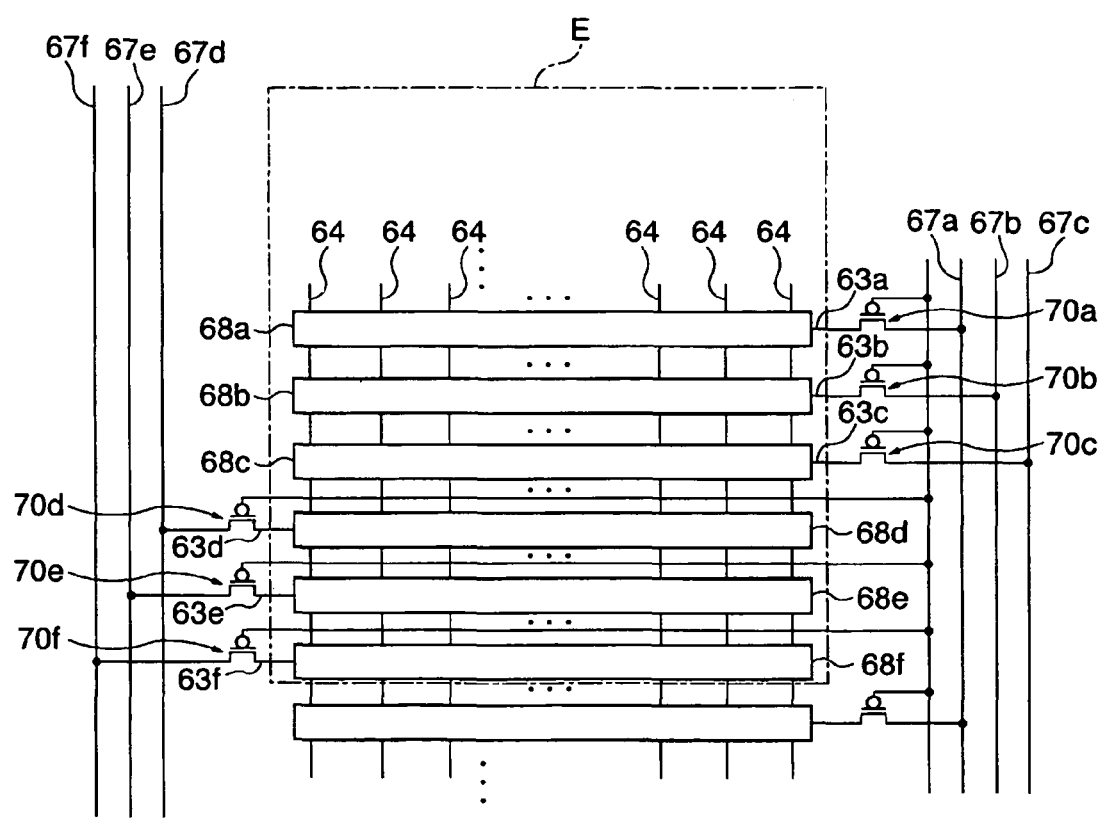
FIG. 22 is a view showing movement of read pixel columns in the region where the scanner unit and the reference member face each other.
Figure 23:
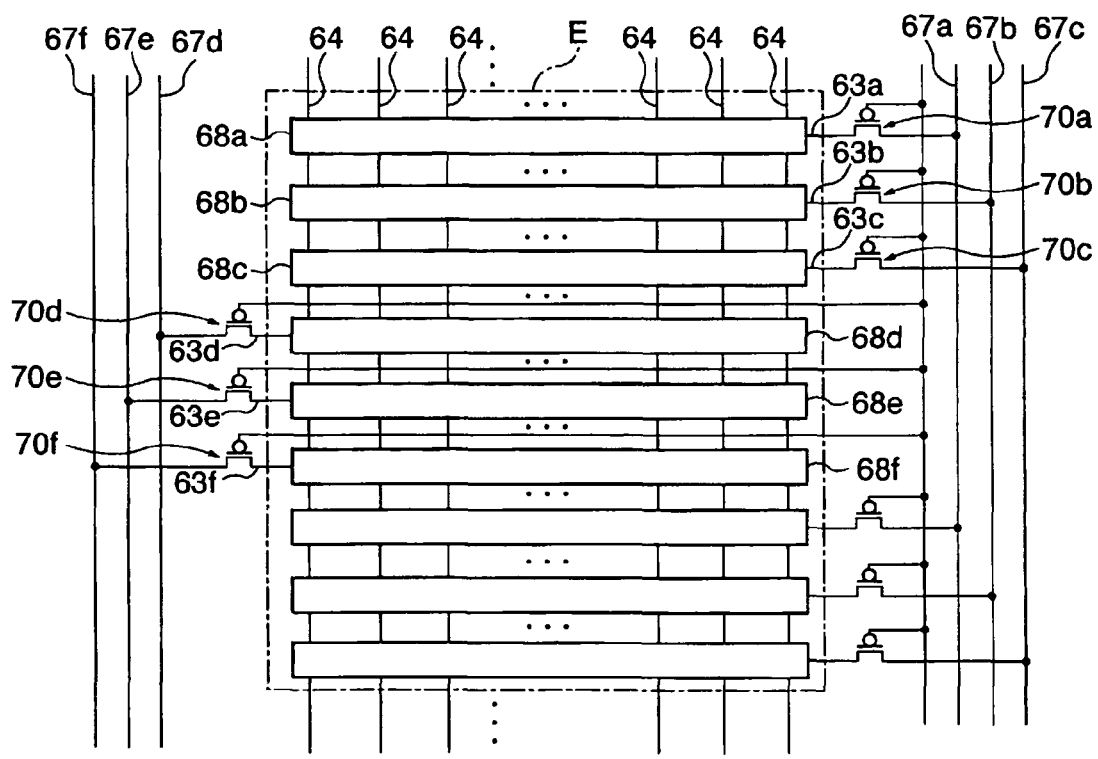
FIG. 23 is a view showing movement of read pixel columns in the region where the scanner unit and the reference member face each other.
Figure 24:
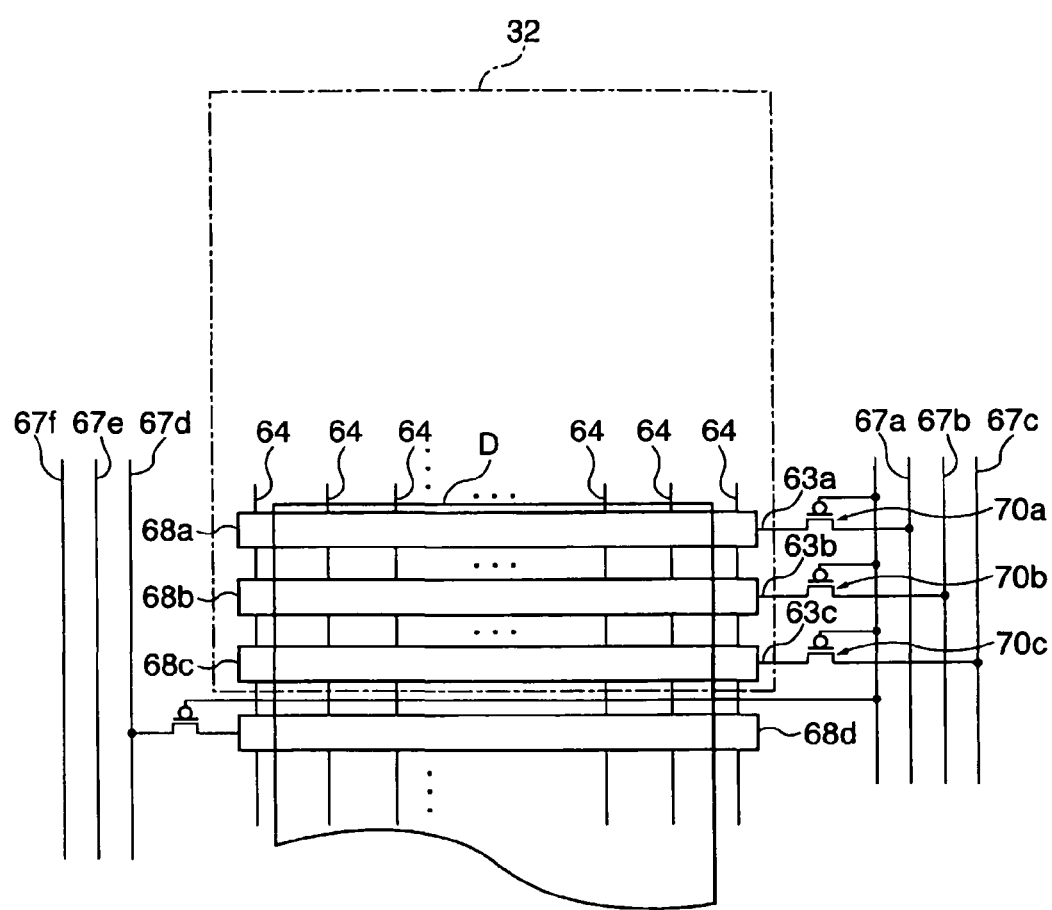
FIG. 24 is a view showing movement of read pixel columns in a nip portion between the scanner unit and a pressurizing portion.
Figure 25:
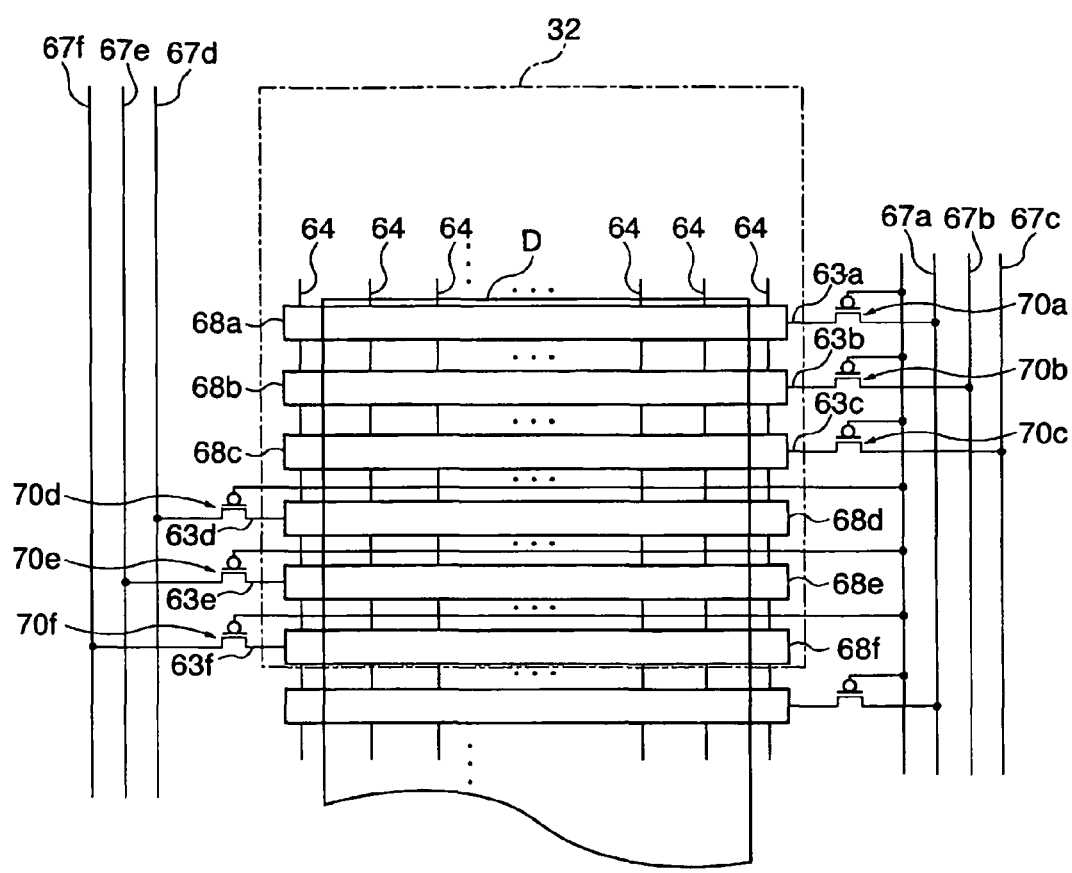
FIG. 25 is a view showing movement of read pixel columns in the nip portion between the scanner unit and the pressurizing portion.
Figure 26:
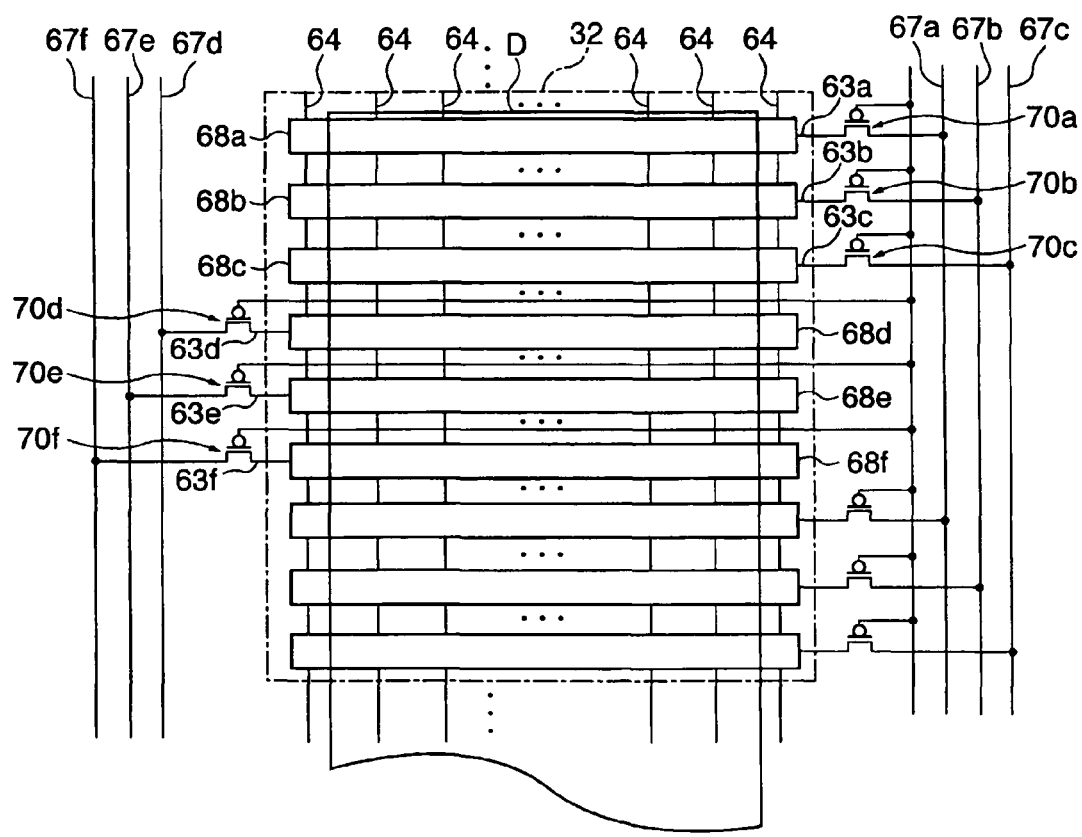
FIG. 26 is a view showing movement of read pixel columns in the nip portion between the scanner unit and the pressurizing portion.

With reference to FIGS. 21 to 26, an explanation will be given of an ADF scanning mode. FIGS. 21 to 23 are views showing motion of read pixels in a region E where the scanner unit 59 and the reference member 42 face each other. FIGS. 24 to 26 are views showing motion of read pixels in a nip portion 32 between the scanner unit 59 and a pressurizing portion 23.

When an operating section (not shown) is operated to thereby generate an instruction for reading an original in the ADF scanning mode, the scanner unit 59 is rotated by a driving motor in the original conveying direction, and shading data is acquired.

In acquiring shading data, an electric current value due to light reflection from the reference member 42 is generated in an organic photodiode 61a of each of read pixels 61 facing the reference member 42. The electric current values generated in the organic photodiodes 61a of the read pixels 61 (FIG. 4B) are read as electrical signals via the word line 63, with the organic transistors 61 switched in sequence. The read electrical signals are each converted into shading data used for shading correction in the image processing section 58. The shading data is stored in a memory (not shown) together with address data of the corresponding read pixel 61.

It is assumed here that the read pixel columns 68a, 68b and 68c have reached the region E facing the reference member 42 (FIG. 21). In the read pixels 61 of these read pixel columns, electric currents value are generated due to light reflection from the reference member 42.

It is assumed that a time period required for the read pixel columns 68a, 68b and 68c to pass through the region E is represented by T1 and a time period required for the electric current values generated in the read pixel columns 68a, 68b, and 68c facing the reference member 42 to rise and to be stabilized is represented by T2. In this case, if the relationship of T2<T1 is satisfied, then it is possible to read stabilized electric current values (shading data) from the read pixel columns 68a, 68b, and 68c before these read pixel columns 68a, 68b, and 68c pass through the region E. To this end, a length of the region E (along the circumferential direction of the cylinder 60) is determined based on the rotating speed of the scanner unit 59, so as to satisfy the relationship between the time periods T1 and T2.

In reading the shading data, the word line selectors 70a, 70b, and 70c connect the read pixel columns 68a to 68c to the first to third column decode lines 67a-67c, respectively. Then, the bit line selectors 71 are switched in sequence for address designation, and pieces of shading data are read from the read pixel columns 68a to 68c. If the read pixels 61 are slow in switching response, then much time is needed to read the shading data from all the read pixels 61 constituting one read pixel column 68.

In the present embodiment where pieces of shading data for three columns are simultaneously read, and therefore, the reading can be made using a time period that is as long as three times the time period for a case where pieces of shading data are sequentially read column by column. As a result, even when the read pixels 61 are slow in switching response, the reading of shading data from the read pixel columns 68a, 68b, and 68c can be carried out using an adequate time during the time the read pixel columns 68a, 68b, and 68c are passing through the region E. The time period within which the read pixel columns 68a, 68b, and 68c pass through the region E corresponds to a time period required for transition from a state shown in FIG. 21 to a state shown in FIG. 22.

During the time period of reading the shading data, subsequent read pixel columns 68d, 68e, and 68f enter the region E, and electric current values generated in the read pixels 61 of the read pixel columns 68d, 68e, and 68f adequately rise and become stable (FIG. 23). Thus, immediately after the completion of reading the shading data from the preceding read pixel columns 68a, 68b, and 68c, the shading data can be read from the subsequent read pixel columns 68d, 68e, and 68f.

As mentioned above, in the present embodiment, the region E in which the scanner unit 59 faces the reference member 42 is extended to cover a plurality of read pixel columns 68, and the read pixel columns 68 are sequentially connected to a plurality of column decode lines 67. According to this construction, even if the organic photodiodes 61a are slow in photoelectric conversion response, it is possible to ensure an adequate time that is long enough to permit an electric current value generated in the organic photodiode 61a to become stable, whereby shading data can be read with stability. Furthermore, since pieces of shading data are simultaneously read from a plurality of read pixel columns 68, the total time required for the shading data reading can be shortened even if the organic transistors 61b are slow in switching response. This makes it possible to realize a higher productivity image reading apparatus.

To attain the same productivity, the switching frequency at which image data is read can be lowered, making it possible to use a low-priced clock generator and reduce noise emitted from the apparatus.

The ADF 40 separates and conveys originals D one by one, which are stacked on the original tray 12 in such a manner that each original D reaches the nip portion 32 between the scanner unit 59 and the pressurizing portion 23 in timing in which a read pixel column 68, for which the acquisition of shading data has been completed, reaches the nip portion 32. In the nip portion 32, each original D is conveyed while being held between the pressurizing portion 23 and the scanner unit 59. Specifically, the original D is conveyed in a state its surface being read is kept in close contact with the scanner unit 59. At this time, the read pixels 61 facing the original D receive light reflected from the original D, and generate electric current values varying in dependence on a light receiving amount, i.e., image information formed on the original D.

For example, electric current values corresponding to an image on the original are generated in the read pixels 61 of the read pixel column 68a, 68b, and 68c which have reached the nip portion 32 and for which the shading data acquisition has been completed (FIG. 24). It is assumed here that a time period required for the read pixel columns 68a, 68b, and 68c to pass through the nip portion 32 is represented by T3 and a time period required for electric current values generated in the read pixel columns 68a, 68b, and 68c facing the original D to rise and to become stable is represented by T4. In this case, if a relationship of T4<T3 is satisfied, the reading of stabilized electric current values (image information) from the read pixel columns 68a, 68b, and 68c can be started before these read pixel columns 68a, 68b, and 68c pass through the nip portion 32 (FIG. 25). To this end, a length of the nip portion 32 (along the circumferential direction of the cylinder 60) is determined based on the rotating speed of the scanner unit 59 so as to satisfy the relationship between the time periods T3 and T4.

During the reading of the image information, the word line selectors 70a to 70c connect the read pixel columns 68a to 68c to the corresponding column decode lines 67a to 67c, respectively. Then, the bit line selectors 71 are sequentially switched for address designation, whereby pieces of image information are read. At this time, if the organic transistor 61b of each read pixel 61 is slow in switching response, much time is required to read the image information from all the read pixels 61 constituting one read pixel column 68.

In the present embodiment, pieces of image information for three columns are simultaneously read as in the case of reading the shading data. As compared to the case of sequentially reading image information column by column, image information can be read using a three-times longer time period. Even if the read pixels 61 are slow in switching response, therefore, a time period long enough to read shading data from the read pixel columns 68a, 68b, and 68c can be ensured before elapse of a time period during which the read pixel columns 68a, 68b, and 68c pass through the region E. The time period during which the read pixel columns 68a, 68b, and 68c pass through the region E corresponds to a time period during which a transition is made from a state shown in FIG. 25 to a state shown in FIG. 26. Since pieces of shading data are simultaneously read from a plurality of read pixel columns 68, the total time required to read these pieces of shading data can be shortened.

During the time period in which the image data is read, the subsequent read pixel columns 68d, 68e, and 68f reach the nip portion 32, electric current values generated in the read pixels 61 of the read pixel columns 68d, 68e, and 68f adequately rise and become stable (FIG. 26). Thus, immediately after completion of reading image data from the preceding read pixel columns 68a, 68b, and 68c, image data can be read from the subsequent read pixel columns 68d, 68e, and 68f.

Next, a relationship between read pixel columns 68 from which image information is read and read pixel columns 68 from which shading data is read will be explained with reference to FIG. 20.

According to the embodiment of the present invention, the reading of image information and the reading of shading data can be made simultaneously. It is assumed that when the read pixels 68a, 68b, and 68c respectively connected to the first to third column decode lines 67a, 67b, and 67c reach the nip portion 32, the read pixel columns 68s, 68t, and 68u reach the region E, which are respectively connected to the fourth to sixth column decode lines 67d, 67e, and 67f.

In this case, pieces of image information are simultaneously read from three read pixel columns 68a, 68b, and 68c located at the nip portion 32, using the first to third column decode lines 67a, 67b, and 67c. At the same time, pieces of shading data are simultaneously read from three read pixel columns 68s, 68t, and 68u located in the region E, using the fourth to sixth column decode lines 67d, 67e, and 67f.

In this manner, using different decode lines, the reading of image data and the reading of shading data can simultaneously be performed. As compared to a case where these two readings are individually performed, a higher productivity image reading apparatus can be realized.

As explained above, according to the present embodiment, the scanner unit 59 is rotated at a circumferential speed nearly equal to the conveying speed of originals D. Therefore, read pixel columns 68 never be moved in the sub-scanning direction relative to the original D being conveyed, during the time period of reading in and reading out image information. As a result, an image on the original D can be faithfully reproduced from the read-in image data. Further, even if dirt, stain or the like is adhered to a surface of the original D or the scanner unit 59, a readout image of dirt or stain never be extended in the sub-scanning direction. Accordingly, no image streaks due to dirt or stain will be produced.

Simultaneous reading of shading data and image information from a plurality of read pixel columns 68 makes it possible to shorten the total time required to read shading data and image information, whereby a high productivity image reading apparatus can be realized.

Seventh Embodiment

Figure 27:
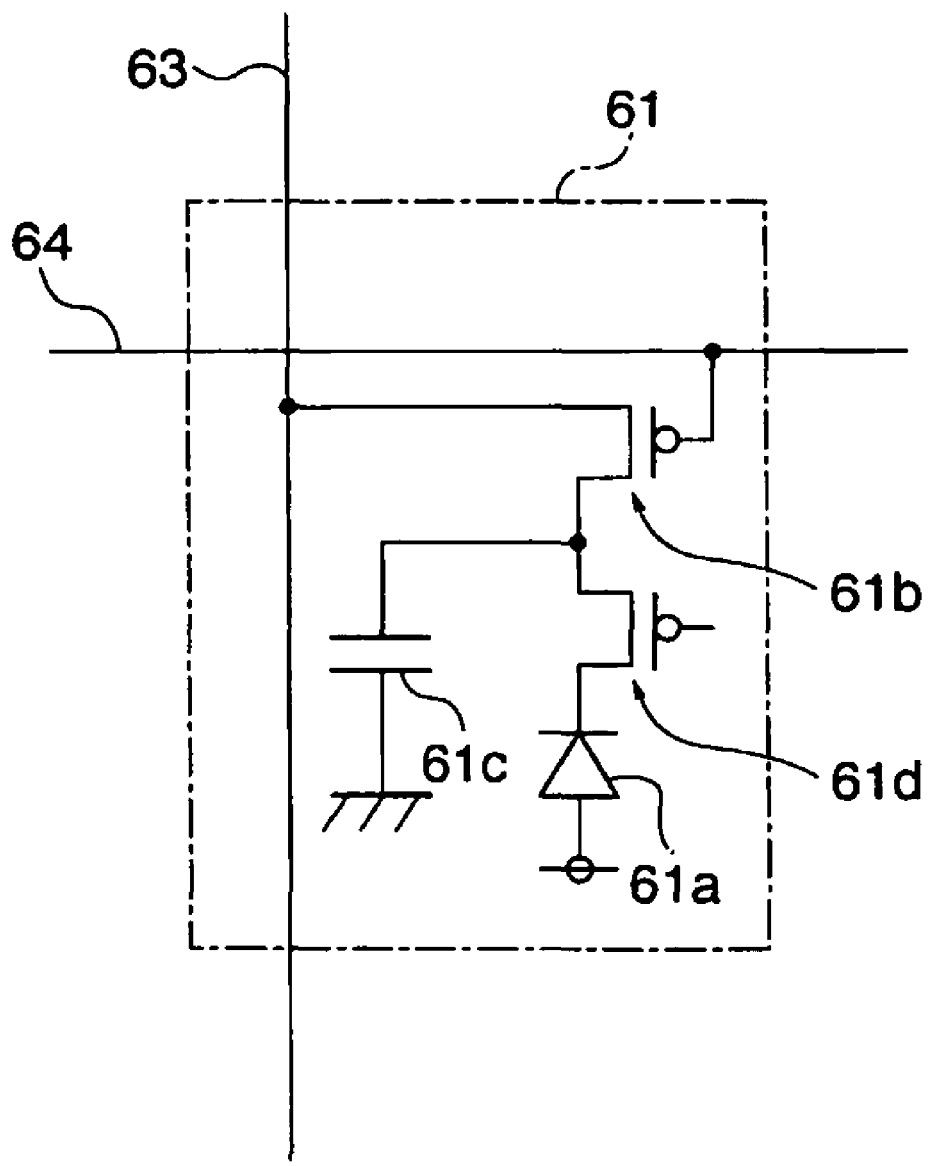
FIG. 27 is a circuit diagram showing the construction of a read pixel of an image reading apparatus according to a seventh embodiment of the present invention.

Next, an explanation will be given of a seventh embodiment of the present invention with reference to FIG. 27. FIG. 27 is a circuit diagram showing the construction of a read pixel of an image reading apparatus according to the present embodiment.

The sixth embodiment is configured that an electric current value generated in a read pixel 61 facing an original or the reference member is directly read out. In contrast, read pixels 61 of the present embodiment are each provided with a capacitor that accumulates electric charge. In this point, the present embodiment is different from the sixth embodiment.

In the present embodiment, as shown in FIG. 27, the read pixel 61 is provided with a capacitor 61c that accumulates electric charge, and an organic transistor 61d. In the capacitor 61c, electric charge is accumulated, which is generated by the organic photodiode 61a acting as a photoelectric conversion element. The organic transistor 61d electrically connects or disconnects the organic photodiode 61a to or from the capacitor 61c.

When a given read pixel 61 has reached the region E and the organic photodiode 61a of this read pixel 61 receives light reflected from the reference member 42, the organic photodiode 61a generates electric charge. The organic transistor 61d connects the organic photodiode 61a to the capacitor 61c, and the electric charge generated in the organic photodiode 61a is stored in the capacitor 61c. After the accumulation of electric charge for a predetermined time period, the organic transistor 61d electrically disconnect the organic photodiode 61a from the capacitor 61c, whereby the accumulation of electric charge is completed. After the completion of electric charge accumulation, the organic transistor 61b is switched on, whereby the electric charge accumulated in the capacitor 61c, i.e., shading data, can be read out.

Next, when the read pixel 61 reaches the nip portion 32 and the organic photodiode 61a of the read pixel 61 receives light reflected from the original D, the organic photodiode 61a generates electric charge varying according to an image on the original. Then, the organic transistor 61d connects the organic photodiode 61a to the capacitor 61c, whereby the electric charge generated in the organic photodiode 61a is stored in the capacitor 61c. After the electric charge is accumulated for a predetermined time period, the organic transistor 61d electrically disconnects the organic photodiode 61a from the capacitor 61c, whereby the accumulation of electric charge is completed. After the completion of accumulation of electric charge, the organic transistor 61b is switched on, whereby the electric charge accumulated in the capacitor 61c, i.e., image data, can be read out.

As explained above, the present embodiment is configured that the electric charge generated due to reflection light from the reference member 42 or the original D is stored in the capacitor 61c, which makes it possible to accumulate shading data or image data using an adequate longer period of time. As a result, even if the organic photodiode 61a is low in photo-electric conversion efficiency, a sufficient amount of electric charge varying depending on the reference member 42 or the image on the original can be accumulated, and the S/N ratio of shading data or image data can be improved. Moreover, the lamp 41 can be smaller in light amount, thus being low in energy consumption, thereby reducing deterioration of the organic semiconductor due to hear or light. As a result, a service life thereof can be prolonged.

As for the reading of electric charge accumulated in the capacitor 61c (image information or shading data), the size of the nip portion 32 or the region E can be large enough to accumulate image information or shading data. As a result, the reference member 42 and the pressurizing portion 23 can be reduced in size as compared to the first embodiment, which makes it possible to further reduce the size and cost of the apparatus and further improve the degree of freedom in designing the layout of the apparatus.

Furthermore, in accumulating shading data, the reading position of the reference member 42 is moved with movement of the read pixel column 68. As a result, the shading data obtained from the accumulated electric charge generated based on reflected light from the reference member 42 is approximate to shading data obtainable using a reference member whose reflection coefficient is equivalent to an averaged reflection coefficient of reference member 42. Specifically, even if the reflection coefficient of the reference member 42 differs from part to part, such difference in reflection coefficient is absorbed to make the obtained shading data uniformed, whereby more uniform read image can be obtained. This indicates that, even if the reference member 42 is partly adhered with stain, for example, disadvantageous influence of stain adhered to the reference member 42 upon shading data is uniformed and reduced, making it possible to obtain more stable read image.

In the sixth and seventh embodiments, the scanner unit 59 is configured using a cylinder. Alternatively, the scanner unit can be configured using an endless belt. In that case, a plurality of read pixels are disposed in a matrix on the endless belt, and the belt is driven in the original conveying direction at a speed nearly equal to the original conveying speed.

In the following, an explanation will be given of an eighth embodiment of the present invention.

Eighth Embodiment

Figure 28:
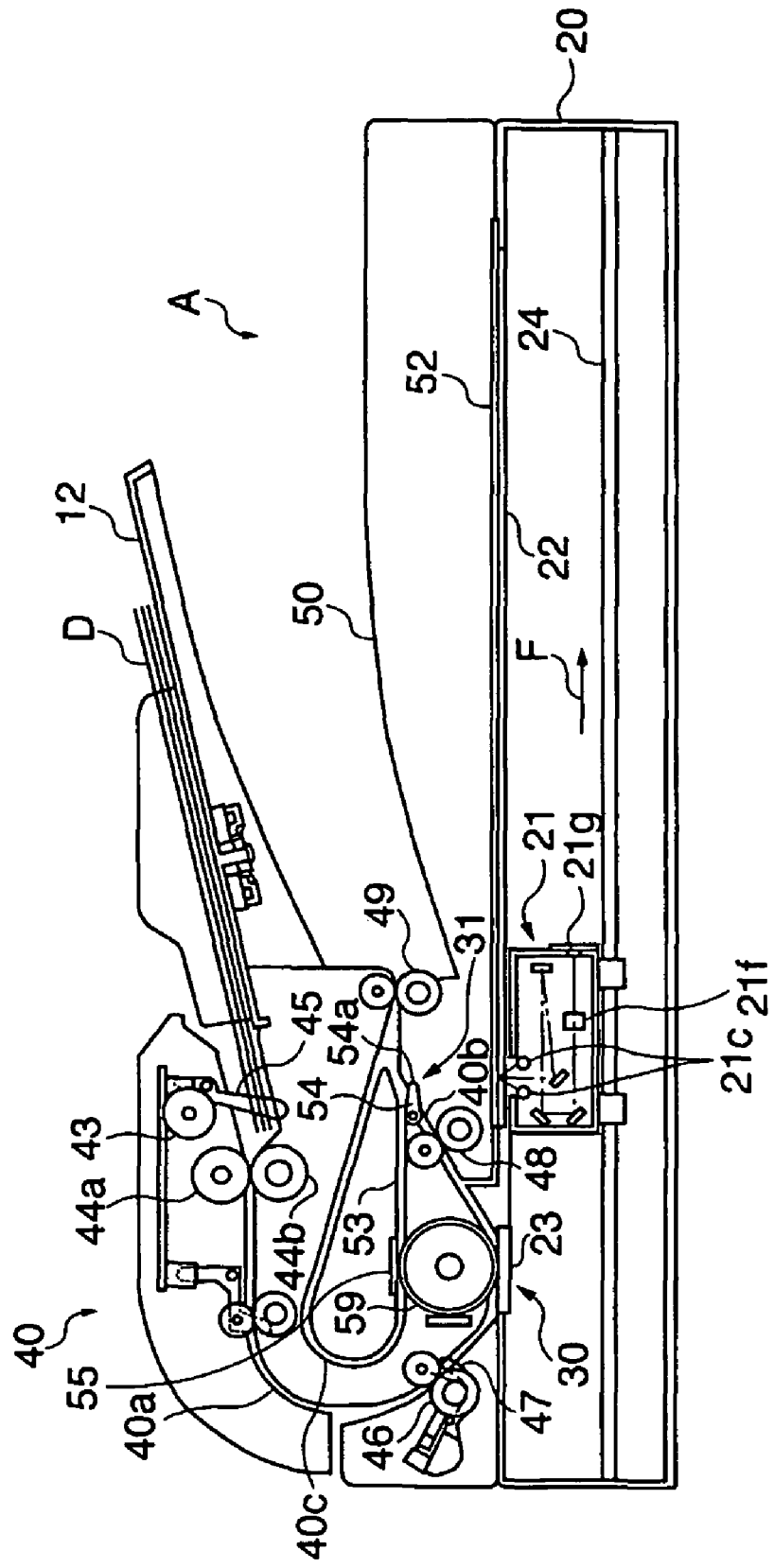
FIG. 28 is a longitudinal section view showing the construction of an image reading apparatus according to an eighth embodiment of the present invention.

FIG. 28 is a longitudinal section view showing the construction of an image reading apparatus according to the present embodiment.

The image reading apparatus A of the present embodiment is constructed basically the same as the apparatus A of the first embodiment shown in FIG. 1, but differs therefrom in that it is capable of carrying out double-sided reading. More specifically, as shown in FIG. 28, the image reading apparatus A of the present embodiment is comprised of an ADF 40 having an original detecting sensor 45, and a scanner apparatus 20. Originals D stacked on an original tray 12 are separated one by one by a pickup roller 43 and a pair of separation rollers 44a, 44b, and then drawn into a U turn-shaped conveying path 40a. Each original D is conveyed by a conveyance roller 46 to a reading section 30 at a predetermined fixed conveying speed along a conveying path 40a. An original edge sensor 47 for detecting an end of an original D is disposed in the vicinity of the conveyance roller 46.

The reading section 30 is provided with a scanner unit 59, a pair of pressurizing members 23, 55 disposed so as to face the scanner unit 59, and a reference member 42 used to obtain shading correction data (shading data). A nip portion is formed between the scanner unit 59 and the pressurizing member 23, and a nip portion is formed between the scanner unit 59 and the pressurizing member 55. When an original D passes through the reading section 30, image information on the original D is read by the scanner unit 59. The details of the reading section 30 will be explained later.

The original D passing through the reading section 30 is delivered by the conveyance roller 48 to a branching point 31 along the conveying path 40b. Between the conveyance roller 48 and the branching point 31, there is provided an inversion flap 54 whose distal end 54a is usually suspended down into the conveying path 40b due to its own weight. The original D conveyed by the conveyance roller 48 causes the inversion flap 54 to move upward, and is further delivered toward a discharge roller 49. The discharge roller 49 is rotated forwardly when it discharges the original D onto the discharge tray 50, and reversely rotated when it guides the original D toward an inversion conveying path 53.

The original D introduced into the inversion conveying path 53 is further conveyed via the reading section 30 to the discharge roller 49 along the U turn-shaped conveying path 40c. Then, the original D is discharged onto the discharge tray 50 by the discharge roller 49.

As in the ADF 40 shown in FIG. 1, the ADF 40 is configured to be capable of being opened and closed relative to the scanner apparatus 20. By opening the ADF 40, the original D can be placed on the platen glass 22 of the scanner apparatus 20.

The scanner apparatus 20 uses a scanner unit 21 to read the original placed on the platen glass 22. The scanner unit 21 is configured in the same manner as the scanner unit shown in FIG. 1, and an explanation thereof will be omitted.

The image reading apparatus A comprises two modes, i.e., an ADF scanning mode in which the ADF 40 is used and a fixed original scanning mode in which the scanner unit 21 is used, and is capable of reading an original in either mode.

In the case of the ADF scanning mode, the ADF 40 feeds each of originals D stacked on the original tray 12. Each original D fed by the ADF is delivered to the reading section 30 where image information on a first surface (front surface) of the original D is read by the scanner unit 59.

When the single-sided scanning mode is set, an original D passing through the reading section 30 is delivered by the conveyance roller 48 to the discharge roller 49 via the inversion flap 54. By the discharge roller 49, the original D is then discharged onto the discharge tray 50.

On the other hand, when the double-sided scanning mode is set, an original D whose first surface has been read by the reading section 30 is delivered by the conveyance roller 48 toward the discharge roller 49 via the inversion flap 54. Then, the original D is conveyed by the discharge roller 49 until the rear end of the original D passes through the inversion flap 54. Next, the discharge roller 49 is reversely rotated, and the original D is guided toward the inversion conveying path 53 while being guided by the upper surface of the inversion flap 54, and is then delivered to the reading section 30. In the reading section 30, when the original D passes through the nip portion between the scanner unit 59 and the pressurizing member 55, a second surface (rear surface) of the original D is read by the scanner unit 59. The original D having passed through the reading section 30 is conveyed toward the discharge roller 49 along the conveying path 40c, and is then discharged onto the discharge tray 50 by the discharge roller 49.

In the case of the fixed original scanning mode, as in the first embodiment, the original D placed on the platen glass 22 is moved in the sub-scanning direction, while being read in the main scanning direction by the scanner unit 21, whereby the entire original is read.

Figure 29:
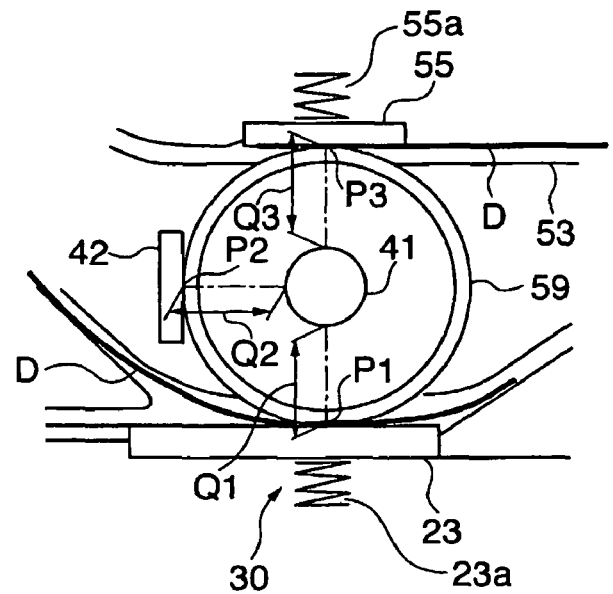
FIG. 29 is a longitudinal section view schematically showing the construction of peripheral components of the scanner unit of FIG. 28.
Figure 30:
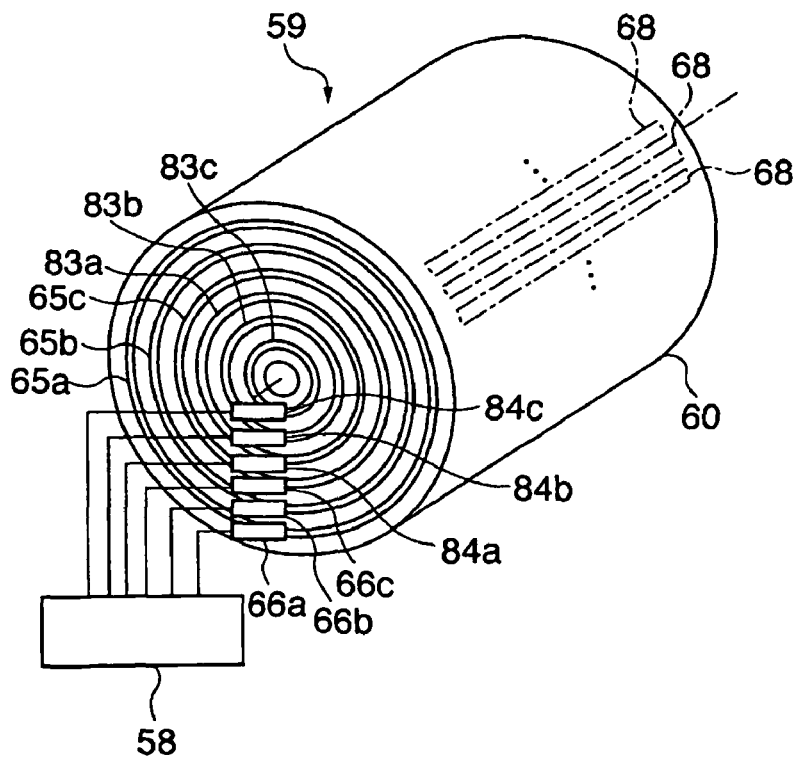
FIG. 30 is a perspective view showing the construction of connection between an image processing section and the scanner unit of FIG. 28.
Figure 31:
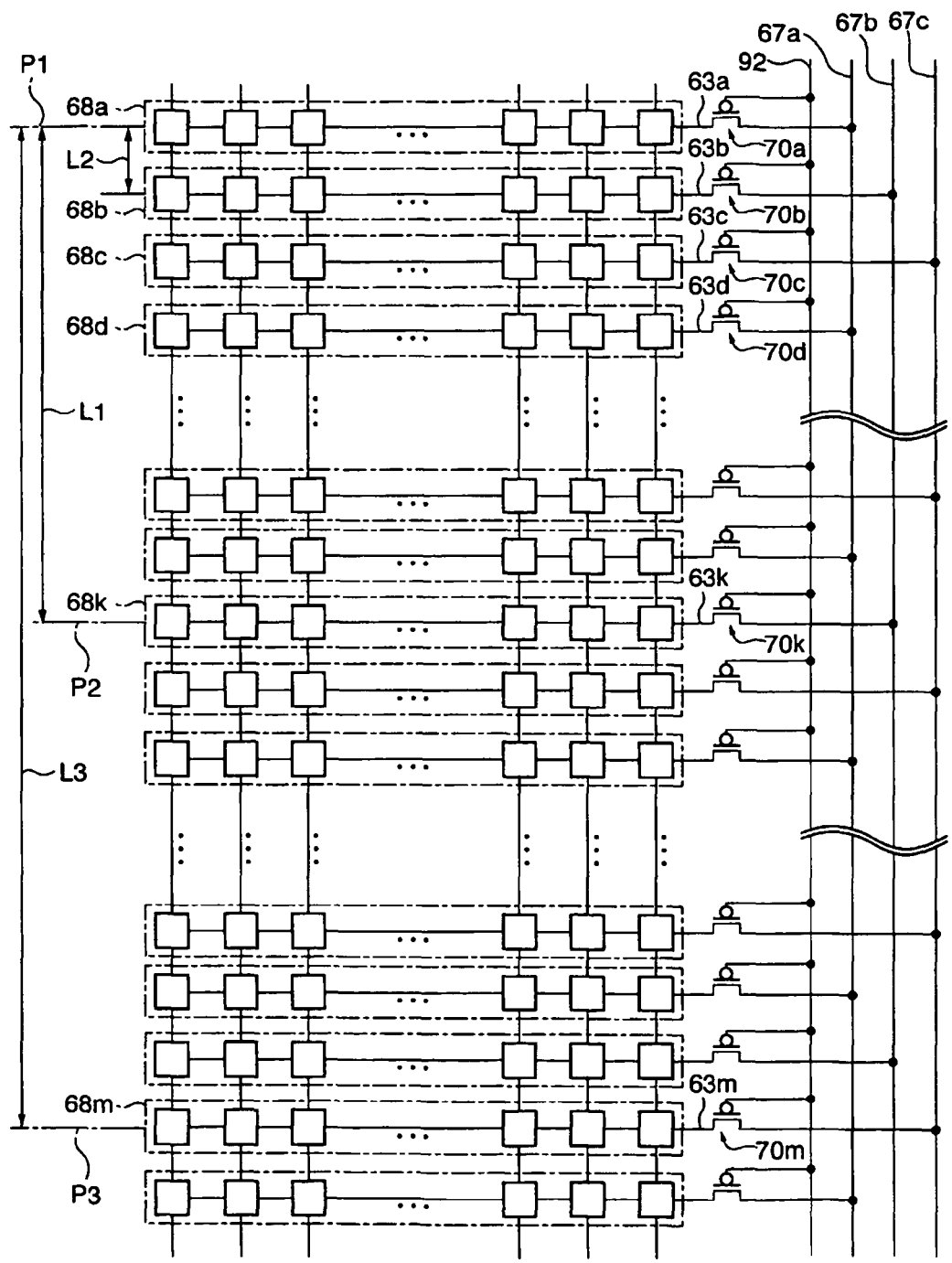
FIG. 31 is a view showing the construction of an array of a plurality of read pixels and a peripheral circuit thereof that are alternative to those shown in FIG. 4A.

Next, the reading section 30 will be explained in detail with reference to FIGS. 29 to 31. FIG. 29 is a longitudinal section view schematically showing the construction of peripheral components of the scanner unit 59 shown in FIG. 28. FIG. 30 is a perspective view showing the construction of connection between the scanner unit shown in FIG. 28 and the image processing section. FIG. 31 is a view showing the construction of an array of a plurality of read pixels and their peripheral circuit, which are alternative to those shown in FIG. 4A.

The scanner unit 59 disposed in the reading section 30 is constructed basically in the same manner as the scanner unit 59 of the first embodiment shown in FIGS. 2A to 4B. Specifically, as shown in FIG. 29, the scanner unit 59 of the present embodiment includes a cylinder 60 and a lamp 41 that is attached to the inside the cylinder 60 by supporting members 41a (FIG. 3B). The scanner unit 59 is rotatably driven by a driving force transmitted from a driving motor to one of the supporting members 41a in the direction of conveying originals D at a circumferential speed nearly equal to the conveying speed of the originals D.

As shown in FIG. 29, the pressurizing member 23 is disposed so as to be in contact with an outer peripheral surface of the scanner unit 59, and is pressed against the outer peripheral surface of the scanner unit 59 by a spring member 23a with a predetermined pressing force. Between the pressurizing member 23 and the scanner unit 59, there is formed a nip portion for holding and conveying an original D. When an original D passes through the nip portion, the original D is made in contact with the outer peripheral surface of the scanner unit 59. Here, it is assumed that the contact position between the original D (pressurizing member 23) and the scanner unit 59 will be referred to as the first image reading position P1.

The pressurizing member 55 is disposed to face the pressurizing member 23 in a diametrical direction of the scanner unit 59. As with the pressurizing member 23, the pressurizing member 55 is pressed against the outer peripheral surface of the scanner unit 59 by a spring member 55a with a predetermined depressing force. Between the pressurizing member 55 and the scanner unit 59, a nip portion for holding and conveying an original D is formed. When an original D passes through the nip portion, the original D is made in contact with the outer peripheral surface of the scanner unit 59. It is assumed that the contact position between the original D (pressurizing member 55) and the scanner unit 59 will be referred to as the second image reading position P3.

The reference member 42 faces the outer peripheral surface of the scanner unit 59, and is disposed at the position P2 that is angularly π/2 (rad) apart from the first image reading position P1 in the circumferential direction of the scanner unit 59. The position P2 is a reference member reading position.

As in the first embodiment shown in FIGS. 3A and 3B, a plurality of read pixels 61 are disposed in a matrix on the outer peripheral surface of the cylinder 60 (FIG. 2B).

More specifically, as shown in FIG. 30, a plurality of read pixel columns 68 are arranged on the outer peripheral surface of the cylinder 60 along the circumferential direction of the cylinder 60 with a spacing between one another. Each read pixel column 68 includes a plurality of read pixels 61, which are arranged with a spacing in the axial direction of the cylinder 60. A light shielding film 62 that prevents light from the lamp 41 from directly entering the read pixel 61 is provided on the rear surface of the read pixel 61. A protective film 80 that protects the read pixel 61 is formed on the outer peripheral surface of the cylinder 60.

The array of the read pixels 761 on the outer peripheral surface of the cylinder 60 can be developed into a matrix array. The matrix array is the same as the array shown in FIG. 4A, and an explanation thereof will be omitted.

The read pixels 61 are constructed in the same manner as those shown in FIG. 4B, and an explanation thereof will be omitted.

As in the third embodiment shown in FIG. 8, a circuit arrangement having a plurality of column decode lines 67 can be adopted in the present embodiment as shown in FIG. 31. This is intended to simultaneously carry out the reading of an original D and the reading of the reference member 42. Each of the read pixels 61 has the same construction as the one mentioned above.

It is assumed here that read pixel columns 68a, 68b, - - -, 63k, - - - -, 63m, - - -, which are formed by read pixels 61 arranged in a line in the column direction, are arranged in this order toward the downstream direction of the scanner unit 59. A word line 63a connected to the read pixel column 68a is connected through a word line selector 70a to a first column decode line 67a. A word line 63b connected to a read pixel column 68b adjacent to the read pixel column 68a is connected through a word line selector 70b to a second column decode line 67b. A word line 63c connected to a read pixel column 68c is connected through a word line selector 70c to a third column decode line 67c. A word line 63d connected to a read pixel column 68d is connected through a word line selector 70d to the first column decode line 67a.

Similarly, each word line 63 connected to a corresponding read pixel column 68 is connected in order to an associated one of the column decode lines 67a to 67c.

When the circuit construction as shown in FIG. 31 is adopted, the scanner unit 59 is provided at its one end face with a plurality of endless terminals 65a, 65b, 65c, 83a, 83b, and 83c as shown in FIG. 30. The terminal 65a is connected to the first column decode line 67a, the terminal 65b is connected to the second column decode line 67b, and the terminal 65c is connected to the third column decode line 67c. The terminal 83a is connected to a row decode line 69, the terminal 83b is connected to a bit selector line 91, and the terminal 83c is connected to a word selector line 92.

Connecting terminal 66a to 66c and 84a to 84c are in sliding contact with the terminals 65a to 65c and 83a to 83c, respectively. Each of the connecting terminals 66a to 66c and 84a to 84c constitutes a spring contact and is electrically connected to the image processing device 58.

Even when the scanner unit 59 rotates, the connecting terminal 66a to 66c and 84a to 84c are kept in sliding contact with the corresponding terminals 65a to 65c and 83a to 83c, respectively. As a result, even during the rotation of the scanner unit 59, electrical connection is kept maintained between the image processing section 58 and the row decode line 69, first to third column decode lines 67a to 67c, bit line selector control line 91, word line selector control line 92.

The image processing section 58 controls the reading of electrical signals (image information) from read pixels 61 of the scanner unit 59 and subjects the electrical signals read from the read pixels 61 to predetermined processing to thereby generate image data suitable for being processed by an external apparatus, e.g., the printer apparatus B. The generated image data is delivered to the printer apparatus B.

The image processing section 58 is constructed in the same manner as that of the first embodiment shown in FIG. 5, and an explanation thereof will be omitted.

Next, an explanation will be given of a positional relationship between the first image reading position P1 and the reference member reading position P2.

The reference member reading position P2 is at a location different from the first image reading position P1 (and the second image reading position P3). In the present embodiment, the positional relationship between the first image reading position P1 and the reference member reading position P2 is determined such that the read pixel column 68k is at the reference member reading position P2 when the read pixel column 68a is at the first image reading position P1, as shown in FIG. 31.

It is assumed that a distance between the first image reading position P1 and the reference member reading position P2 along the circumferential direction of the scanner unit 59 is indicated by L1 and a distance between adjacent read pixel columns 68 (along the circumferential direction of the scanner unit 59) is indicated by L2. In this case, the distance L1 is set so as to satisfy the following equation.

$$L1=(3n+1)L2, \text{ where } n \text{ represents a positive integer including zero.}$$

Thus, the read pixel column 68a at the first image reading position P1 reads image information on a first surface of an original, with the word line selector 70a connected to the first column decode line 67a. At the same time, the read pixel column 68k at the reference member reading position P2 reads shading data, with the word line selector 70b connected to the second column decode line 67b. In this manner, it is possible to concurrently carry out the reading of the image information on a first surface of an original D and the reading of the shading data.

Next, an explanation will be given of a positional relationship between the first image reading position P1 and the second image reading position P3.

Figure 32:
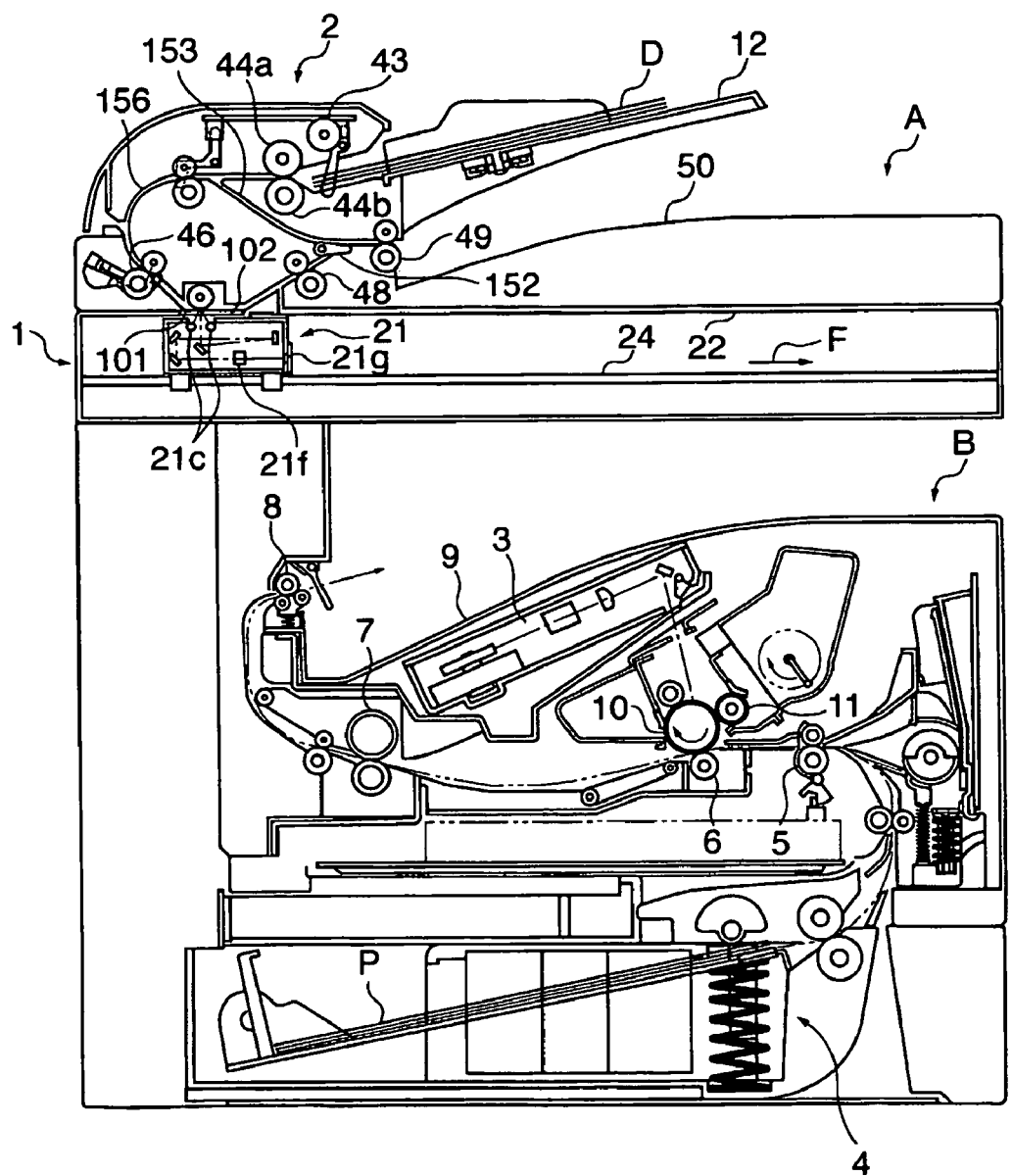
FIG. 32 is a longitudinal section view showing the construction of an image forming apparatus having a conventional image reading apparatus.
Figure 33:
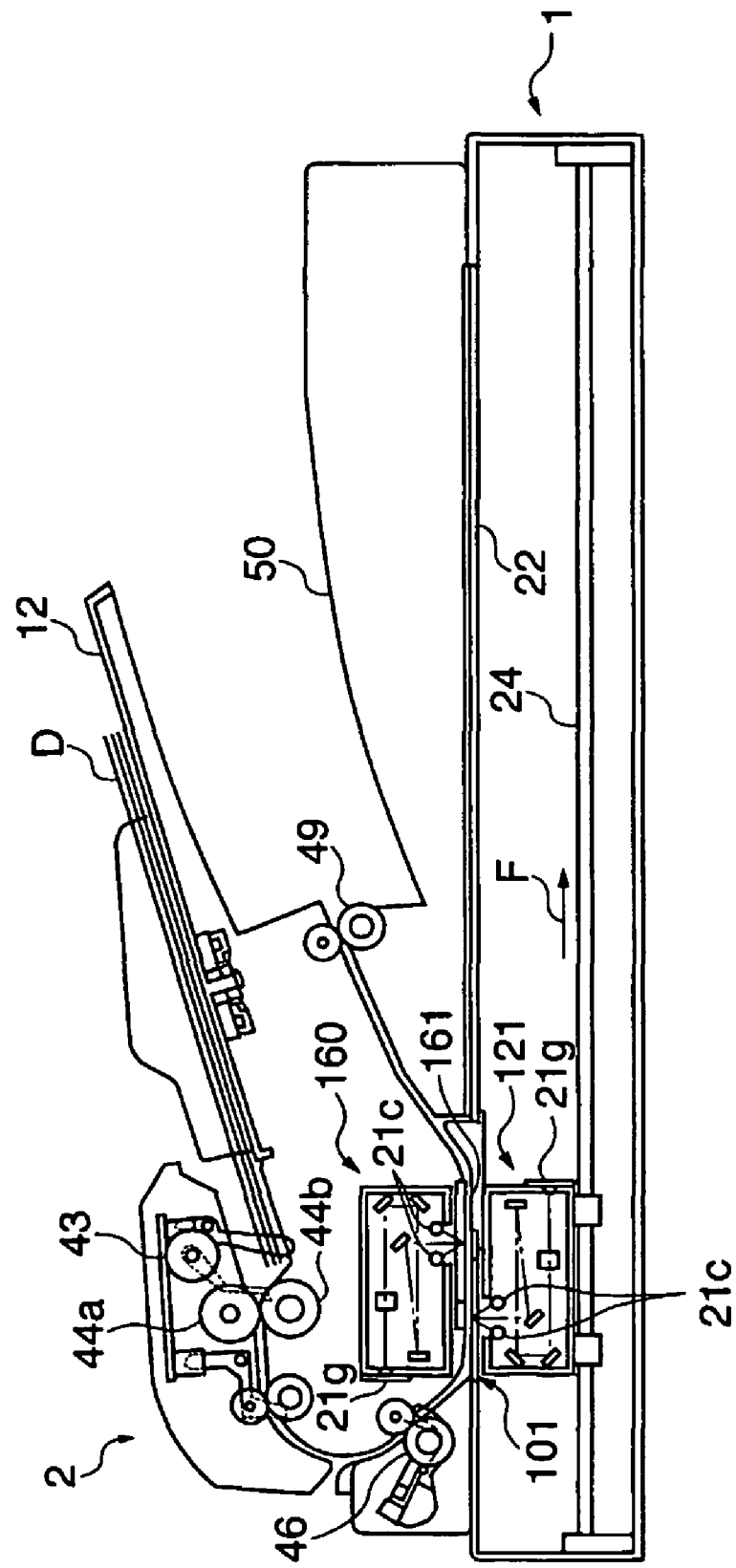
FIG. 33 is a longitudinal section view showing the construction of the conventional image reading apparatus capable of simultaneously reading images on both sides of an original.

The second image reading position P3 where a second surface of an original D is read is at a location different from the first image reading position P1 and the reference member reading position P2. In the present embodiment, the positional relationship between the first image reading position P1 and the second image reading position P3 is determined such that the read pixel column 68m is at the second image reading position P3 when the read pixel column 68a is at the image reading position P1, as shown in FIG. 32.

Thus, a distance between the first image reading position P1 and the second image reading position P3 along the circumferential direction of the scanner unit 59 is indicated by L3 and a distance between adjacent read pixel columns 68 (along the circumferential direction of the scanner unit 59) is indicated by L2. In this case, the distance L3 is set so as to satisfy the following equation.

$$L1=(3n-1)L2, \text{ where } n \text{ represents a positive integer including zero.}$$

Thus, the read pixel column 68a at the image reading position P1 reads image information on the first surface of an original D, with the word line selector 70a connected to the first column decode line 67a. At the same time, the read pixel column 68m at the second image reading position P3 can read image information on the second surface of an original D, with the word line selector 70c connected to the third column decode line 67c.

Next, a detailed explanation will be given of the reading operation in the ADF scanning mode.

When the operating section is operated to thereby give an instruction for reading an original in the ADF scanning mode, the scanner unit 59 is rotated in the original conveying direction; and shading data is acquired at the reference member reading position P2. At this time, the circumferential speed of the scanner unit 59 is nearly equal to the conveying speed of originals D. Further, the lamp 41 is lit, and light from the lamp 41 passes through between read pixels 61 on the cylinder 60 of the scanner unit 59, and irradiates the reference member 42.

In acquiring shading data, the organic transistors 61b of those read pixels 61 of the read pixel column 68 which face the reference member 42 are sequentially switched on, whereby electric current values generated by the organic photodiodes 61a of these read pixels 61 are read out through the word line 63, word line selector 70, and column decode line 67 associated therewith. Each read electric current value is converted into shading data in the image-processing section 58 and stored in a memory (not shown) together with address data for the read pixel 61.

The ADF 40 starts conveying an original D in timing at which those read pixel columns 68 which have completed the shading data acquisition reaches the first image reading position P1. When reaching the first image reading position P1, the original D is made in contact with the outer peripheral surface of the scanner unit 59 by the pressurizing member 23. At this time, the organic photodiodes 61a of the read pixels 61 of the read pixel column 68 facing the original D receive light reflected from the original and generate electric current values varying depending on image information on the original D. Then, the organic transistors 61b of the read pixels 61 of the read pixel column facing the original D are sequentially switched on, whereby the electric current values generated in the organic photodiodes 61a of the read pixels 61 are read out, as electrical signals, through the word line 63 concerned. Each read out electrical signal is subjected to various processing including shading correction in the image processing section 58. In the shading correction, shading data obtained from a given read pixel 61 is used for the image information obtained from the same read pixel 61.

During the image reading, the scanner unit 59 is rotatably driven at a circumferential speed nearly equal to the conveying speed of originals D. Therefore, the read pixel 61 never be moved in the sub-scanning direction relative to the original D. As a result, even when dirt or stain is adhered to a surface of the original D or the scanner unit 59, an image of dirt or stain never be extended in the sub-scanning direction, and hence no image streaks are produced unlike the prior art.

After completion of reading the first surface of the original D at the first image reading position P1, the original D is conveyed by the conveyance roller 48 and the discharge roller 49 until the rear end of the original D passes through the branching point 31, and is then caused to temporarily stop. Next, the discharge roller 49 is reversely rotated, and the original D is delivered with its rear end in the lead. When the rear end of the original D reaches the branching point 31, the original D is guided onto an upper surface of the inversion flap 54 and guided toward the inversion conveying path 53. The original D is then conveyed toward the second image reading position P3 in the reading section 30.

At the second image reading position P3, the original D is conveyed by the pressurizing member 55, with the second surface of the original D made in contact with the outer peripheral surface of the scanner unit 59. At this time, in the read pixels 61 of the read pixel column 68 facing the second surface of the original D, the organic photodiodes 61a generate, due to light reflected from the second surface of the original D, electric current values varying depending on image information on the original D. Then, the organic transistors 61b of the read pixels 61 of the read pixel column facing the original D are sequentially switched on, whereby the electric current values generated in the organic photodiodes 61a of the read pixels 61 are read out, as electrical signals, through the word line 63 concerned. Each electrical signal read out is subjected to various processing including shading correction in the image processing section 58.

Concurrently with the reading of the second surface of the original D at the second image reading position P3, the first surface of a subsequent original D is read out at the first image reading position P1. It is assumed here that the read pixel column 68m is at the second image reading position P3. Thus, the read pixel column 68a is at the first image reading position P1. The reading of image information from the read pixel column 68m at the second image reading position P3 and the reading of image information from the read pixel column 68a at the first image reading position P1 are carried out through the different column decode line 67c and 67a, respectively. As a result, it is possible to simultaneously carry out the reading of the second surface of a given original D and the reading of the first surface of a subsequent original D.

The original D whose second surface has been read at the second image reading position P3 passes through the conveying path 40c and is then discharged by the discharge roller 49 onto the discharge tray 50. It should be noted that the original D is caused to pass through the conveying path 40c in order to adjust the stack order of originals D.

Furthermore, the length of the conveyance path from the branching point 31 to the second image reading position P3 can be shortened than the length of the conveyance path from the inversion flap 152 to the flow reading position 101 via the inversion conveying path 153 and conveying path 156 in the conventional image reading apparatus shown in FIG. 32. This makes it possible to reduce the degree of skewing of originals D which would be caused by relative inclination of the conveyance roller 46, conveyance roller 48, and discharge roller 49 and a variation in diameter of the conveyance rollers. As a result, a positional deviation between and a deformation of images formed based on pieces of image data respectively read from the first and second surfaces of the same original D can be reduced.

As shown in FIG. 29, a distance Q1 between the lamp 41 and the first image reading position P1 is equal to a distance Q3 between the lamp 41 and the second image reading position P3. Therefore, an amount of light illuminating an original at the first image reading position P1 is approximately equal to that at the second image reading position P3. As a result, no substantial quality difference is caused between images read from the opposite surfaces of each original D.

Furthermore, when a distance Q2 between the lamp 41 and the reference member reading position P2 is made nearly equal to each of the distances Q1 and Q3, an amount of light illuminating the reference member at the time of acquisition of shading data is nearly equal to an amount of light illuminating the original at the time of image reading. This makes it possible to obtain pieces of shading data suitable for images read from the opposite surfaces of each original D, whereby these two images can be made further uniform.

Since the lamp 41 is disposed inside the cylinder 60 coaxially therewith, it is easy to make the distances Q1, Q2 and Q3 approximately equal to one another.

As explained above, according to the present embodiment, the first surface of an original is read out at the first image reading position P1, and the second surface of the original D is read out at the second image reading position P3, and therefore, the reading time can be shortened especially when the double-sided reading is carried out for a plurality of originals.

Furthermore, since the opposite surfaces of an original are read out using the single scanner unit 59, highly accurate image reading with less image deformation can be achieved, as compared to the case of performing the double-sided reading of an original using two scanner units. This is because there are no positional deviation and inclination of images due to a positional deviation between two scanner units.

The present embodiment employs the scanner unit 59 in which the cylinder is used. Alternatively, the scanner unit can be configured using an endless belt. In this case, a plurality of read pixels are disposed in a matrix on the endless belt, and the endless belt is driven in the original conveying direction at a speed approximately equal to the original conveying speed.

As many apparently widely different embodiments of the present invention can be made without departing from the spirit and scope thereof, it is to be understood that the invention is not limited to the specific embodiments thereof except as defined in the appended claims.

The invention claimed is:

1. An image reading apparatus comprising:
   an original conveying device that conveys an original;
   a rotating member having an outer peripheral surface on which a plurality of optical sensors are arranged in a matrix; and
   a driving device that causes said rotating member to rotate, wherein an image on the original that is conveyed by said original conveying device is read by said plurality of optical sensors on said rotating member while said rotating member is rotated by said driving device such that said driving device causes said rotating member to rotate in the same direction as a conveying direction of the original that is conveyed by said original conveying device and at a circumferential speed approximately equal to a conveying speed of the original that is conveyed by said original conveying device.

2. The image reading apparatus according to claim 1, further comprising:
   a pressurizing device that causes the original being conveyed to be in face-contact with the outer peripheral surface of said rotating member.

3. The image reading apparatus according to claim 2, wherein said plurality of optical sensors each include
   a photoelectric conversion element, and
   a capacitor that accumulates electric charge generated by said photoelectric conversion element,
   wherein in each of said plurality of optical sensors which face the original that is in face-contact with the outer peripheral surface of said rotating member, the capacitor accumulates electric charge generated by the photoelectric conversion element for a predetermined time period within a time period during which the optical sensor faces the original.

4. The image reading apparatus according to claim 1, wherein said plurality of optical sensors are arranged in a pattern in which a predetermined number of optical sensor columns extending in a main scanning direction and arranged in a rotating axis direction of said rotating member are arranged with a predetermined spacing in a sub-scanning direction perpendicular to the main scanning direction.

5. The image reading apparatus according to claim 4, further comprising:

a reference member provided at an image reading position and used for obtaining shading correction data, wherein each of the optical sensor columns reads the reference member when reaching the image reading position by rotation of said rotating member, and reads the image on the original after all the optical sensor columns extending in the main scanning direction complete reading the reference member.

6. The image reading apparatus according to claim 4, further comprising:

a reference member used for obtaining shading correction data, said reference member being provided at a reference member reading position that is different from an image reading position at which said plurality of optical sensors read the image on the original, wherein each of the optical sensor columns reads the reference member when reaching the reference member reading position by rotation of said rotating member, and reads the image on the original when reaching the image reading position.

7. The image reading apparatus according to claim 1, wherein said rotating member is cylindrical in shape.

8. The image reading apparatus according to claim 7, wherein said rotating member has a base material made of an optically transparent member, and includes an illuminating device for illuminating the original which is disposed in the base material.

9. The image reading apparatus according to claim 1, wherein said rotating member has a base material formed in an endless belt, and a surface of the base material forms the outer peripheral surface of the rotating member.

10. The image reading apparatus according to claim 9, wherein the base material is comprised of an optically transparent sheet member and is stretched between a plurality of pulleys, wherein one of said plurality of pulleys includes an illuminating device that illuminates the original and has light transparency.

11. The image reading apparatus according to claim 10, wherein at least one of said plurality of pulleys is rotatably driven by said driving device.

12. The image reading apparatus according to claim 9, wherein an optically transparent sheet member of said base material has one end portion and another end portion joined to each other and superimposed one upon another, and wherein said plurality of optical sensors are arranged in optical sensors columns, and optical sensor columns between which a joined portion, where the one end portion and the other end portion of the optically transparent sheet member are superimposed one upon another, is interposed are arranged with a spacing that is as large as an integer multiple of a spacing between other adjacent optical sensors, and image information corresponding to the joined portion is determined by interpolating between image information obtained from one of the optical sensor columns between which the joined portion is interposed and image information obtained from another optical sensor column.

13. The image reading apparatus according to claim 9, wherein the base material is comprised of an optically transparent sheet member having one end portion and another end portion bent and joined so as to face each other, wherein said plurality of optical sensors are arranged in optical sensor columns, and optical sensor columns between which a joined portion, where the one end portion and another end portion of the optically transparent sheet member are bent and joined so as to face each other, is interposed are arranged with a spacing equal to a spacing between other adjacent optical sensors.

14. The image reading apparatus according to claim 1, further comprising:

a reference member for obtaining shading correction data, and which is disposed so as to face the outer peripheral surface of said rotating member, wherein said reference member is read by said plurality of optical sensors while said rotating member is rotated by said driving device.

15. The image reading apparatus according to claim 14, wherein said plurality of optical sensors are arranged in a matrix pattern having a column direction thereof extending in a rotating axis direction of said rotating member and having a row direction thereof extending perpendicular to the rotating axis direction of said rotating member, and wherein pieces of data are simultaneously read out from at least two optical sensor columns among a plurality of optical sensor columns each comprised of optical sensors that are arranged in a line in the column direction.

16. The image reading apparatus according to claim 14, wherein said plurality of optical sensors each include a photoelectric conversion element, and a capacitor that accumulates electric charge generated by said photoelectric conversion element, wherein in each of said plurality of optical sensors which face the reference member, the capacitor accumulates electric charge generated by the photoelectric conversion element for a predetermined time period within a time period during which the optical sensor faces the reference member.

17. The image reading apparatus according to claim 1, further comprising:

an original feeding device that feeds the original;

a second original conveying device configured to further convey the original, which has been conveyed by said original conveying device and whose first surface on which the image is disposed has been read by said plurality of optical sensors at a first reading position, such that the original passes through a second image reading position at which said plurality of optical sensors read a second surface of the original.

18. The image reading apparatus according to claim 17, wherein said plurality of optical sensors are arranged in a matrix pattern having a column direction thereof extending in a rotating axis direction of said rotating member and a row direction thereof extending perpendicular to the rotating axis direction of said rotating member, and wherein pieces of data are simultaneously read out from at least two optical sensor columns among a plurality of optical sensor columns each comprised of optical sensors that are arranged in a line in the column direction.

19. The image reading apparatus according to claim 17, further comprising:

a first pressurizing device provided at the first image reading position for pressing the first surface of the original passing through the first image reading position against said rotating member; and a second pressing device provided at the second image reading position for pressing the second surface of the original passing through the second image reading position against said rotating member.

20. The image reading apparatus according to claim 17, wherein the first image reading position and the second image reading position face each other as viewed in a direction extending perpendicular to a rotating axis of said rotating member.

21. The image reading apparatus according to claim 17, wherein said original conveying device has a first conveying path extending to an original discharge position via the first image reading position, and said second conveying device has a second conveying path branched off from between the first image reading position in the first conveying path and the original discharge position, and extending to the original discharge position via the second image reading position.

* * * * *